(12) United States Patent
Pörzgen et al.

(10) Patent No.: US 12,545,973 B2
(45) Date of Patent: Feb. 10, 2026

(54) STEEL SHEET AND METHOD OF MANUFACTURING A STEEL SHEET FOR PACKAGING

(71) Applicant: thyssenkrupp Rasselstein GmbH, Andernach (DE)

(72) Inventors: Laura Pörzgen, Neuwied (DE); Manuel Köhl, Mendig (DE); Philipp Schmalenbach, Oberlahr (DE); Burkhard Kaup, Andernach (DE)

(73) Assignee: thyssenkrupp Rasselstein GmbH, Andernach (DE)

( * ) Notice: Subject to any disclaimer, the term of this patent is extended or adjusted under 35 U.S.C. 154(b) by 549 days.

(21) Appl. No.: 17/923,780

(22) PCT Filed: Apr. 23, 2021

(86) PCT No.: PCT/EP2021/060657
§ 371 (c)(1),
(2) Date: Nov. 7, 2022

(87) PCT Pub. No.: WO2021/224026
PCT Pub. Date: Nov. 11, 2021

(65) Prior Publication Data
US 2023/0175092 A1 Jun. 8, 2023

(30) Foreign Application Priority Data
May 8, 2020 (DE) ...................... 10 2020 112 485.6

(51) Int. Cl.
*C21D 9/48* (2006.01)
*C21D 8/04* (2006.01)
(Continued)

(52) U.S. Cl.
CPC ............ *C21D 9/48* (2013.01); *C21D 8/0436* (2013.01); *C21D 8/0457* (2013.01);
(Continued)

(58) Field of Classification Search
None
See application file for complete search history.

(56) References Cited

U.S. PATENT DOCUMENTS 3,219,494 A  11/1965 Hartner
10,920,309 B2  2/2021 Kaup
(Continued)

FOREIGN PATENT DOCUMENTS

DE  10 2014 116 929 B3  11/2015
DE  10 2014 112286 A1  3/2016
(Continued)

OTHER PUBLICATIONS

International Search Report and Written Opinion for PCT/EP2021/060657, filed Apr. 23, 2021.
(Continued)

*Primary Examiner* — Anthony M Liang
(74) *Attorney, Agent, or Firm* — Fleit Intellectual Property Law; Paul D. Bianco

(57) ABSTRACT

A method for producing a steel sheet for packaging includes: cold-rolling a hot-rolled steel sheet made from a steel having a carbon content of 10 to 1000 ppm by weight, the steel of the hot-rolled steel sheet having a predetermined recrystallization temperature ($T_R$); heating the cold-rolled steel sheet to a predetermined heating temperature ($T_E$), where $T_R \leq T_E$, the heating performed at least partially in the presence of a nitrogen donor at least until $T_R$ is reached such that when the cold-rolled steel sheet is heated, nitrogen from the nitrogen donor is diffused at least into a near-surface region of the cold-rolled sheet steel and incorporated in the near-surface region, as a result of which the $T_R$ in the near-surface region is increased by a value $\Delta T$, where $T_E < T_R + \Delta T$. Using this method, high-strength steel sheets having a multilayer microstructure can be produced.

11 Claims, 25 Drawing Sheets

(51) Int. Cl.
  *C22C 38/00* (2006.01)
  *C22C 38/02* (2006.01)
  *C22C 38/04* (2006.01)
  *C22C 38/06* (2006.01)
  *C23C 8/26* (2006.01)
(52) U.S. Cl.
  CPC .......... *C21D 8/0473* (2013.01); *C22C 38/002* (2013.01); *C22C 38/004* (2013.01); *C22C 38/02* (2013.01); *C22C 38/04* (2013.01); *C22C 38/06* (2013.01); *C23C 8/26* (2013.01)

(56) References Cited

U.S. PATENT DOCUMENTS

2017/0226609 A1    8/2017  Massicot
2017/0253957 A1*   9/2017  Kaup .................. C21D 8/0236

FOREIGN PATENT DOCUMENTS

EP    0 216 399   B1   1/1990
EP    3 186 401   A1   7/2017
WO    2005/056841 A1   6/2005

OTHER PUBLICATIONS

Result of Examination Report for German Patent Application No. 10 2020 112 485.6, filed May 8, 2020.
Japanese Office Action dated Mar. 6, 2024, for Japanese Patent Application No. 2022-566662.
International Preliminary Report on Patentability dated Nov. 8, 2022, with Written Opinion for PCT/EP2021/060657.

* cited by examiner

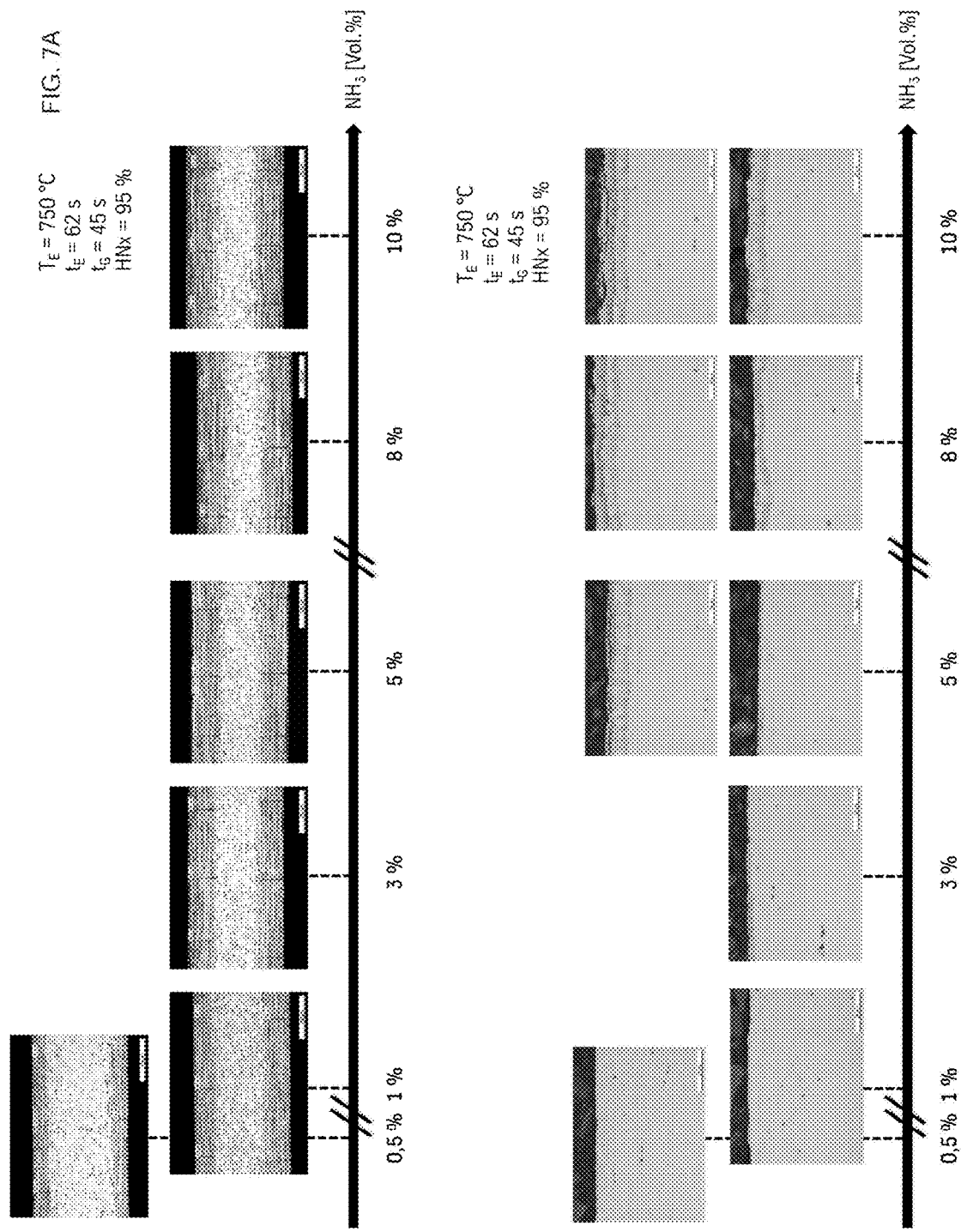

TABLE 1

| | C (ppm) | Si (ppm) | S (ppm) | Mn (ppm) | Ni (ppm) | Cu (ppm) | Cr (ppm) | Mo (ppm) | Nb (ppm) | Ti (ppm) | P (ppm) | N (ppm) |
|---|---|---|---|---|---|---|---|---|---|---|---|---|
| A | | | | | | | | | | | | |
| B | | | | | | | | | | | | |
| C | | | | | | | | | | | | |

FIG. 20

TABLE 2A

| Variant | T$_v$ [°C] | t$_v$ [s] | b [s] | NH$_3$ [Vol. %] |
|---|---|---|---|---|
| Sandwich structure (invention) | 750 | 62 | 46 | 5 |
| roll-hard (comparative example) | - | - | - | - |
| Completely recristallized (comparative example) | 750 | 62 | 46 | - |
| Completely recristallized + nitrided (comparative example) | 750 | 62 | 46 | 5 |

TABLE 2B

| Variant | Rp0.2 [MPa] | Rp0.5 [MPa] | Rm [MPa] | A [%] | Ag [%] |
|---|---|---|---|---|---|
| Sandwich structure (invention) | 968 | 977 | 1014 | 7,8 | 6,0 |
| roll-hard (comparative example) | 725 | - | 775 | 2,5 | 1,4 |
| Completely recristallized (comparative example) | 183 | 184 | 333 | 34,7 | 22,0 |
| Completely recristallized + nitrided (comparative example) | 520 | 530 | 565 | 7,9 | 5,4 |

FIG. 21

TABLE 3A

| Variant | Rp0.2 [MPa] | Rp0.5 [MPa] | Rm [MPa] | A [%] | Ag [%] |
|---|---|---|---|---|---|
| Sandwich structure, 62 s heating | 888 | 977 | 1014 | 7.8 | 6.8 |
| Sandwich structure, 10 s heating | 873 | 889 | 944 | 8.4 | 7.4 |
| Sandwich structure, 1 s heating | 835 | 880 | 977 | 9.3 | 8.2 |

TABLE 3B

| Variant | $T_G$ [°C] | $t_G$ [s] | $t_H$ [s] | $NH_3$ [Vol. %] |
|---|---|---|---|---|
| Sandwich structure, 62 s heating | 750 | 62 | 45 | 5 |
| Sandwich structure, 10 s heating | 750 | 10 | 45 | 5 |
| Sandwich structure, 1 s heating | 750 | 1 | 45 | 5 |

FIG. 22

TABLE 4A

| Variant | T₂ [°C] | t₂ [s] | T₃ [°C] | t₃ [s] | NH₃ [Vol.%] |
|---|---|---|---|---|---|
| 2-stage Field test, 1st stage | 680 | 20 | | 40 | 1 |

| Variant | T₃ [°C] | t₃ [s] | | t₄ [s] | NH₃ [Vol.%] |
|---|---|---|---|---|---|
| 2-stage Field test, 2nd stage | 700 | 20 | | 45 | 0.5 |

TABLE 4B

| Variant 2-stage Field test | Rp0.2 [MPa] | Rp0.5 [MPa] | Rm [MPa] | A [%] | Ag [%] |
|---|---|---|---|---|---|
| DG 0.5% | 775 | 780 | 825 | 8.1 | 5.8 |
| DG 1% | 790 | 797 | 835 | 7.5 | 5.2 |
| DG 5% | 833 | 835 | 845 | 4.8 | 1.5 |
| DG 10% | 848 | 862 | 870 | 2.9 | 0.9 |

DG = degree of skin-pass

FIG. 23

STEEL SHEET AND METHOD OF MANUFACTURING A STEEL SHEET FOR PACKAGING

FIELD OF THE INVENTION

The invention relates to a method for producing a steel sheet and to a steel sheet, in particular for packaging.

BACKGROUND

In the production of packaging from steel sheets, such as tinplate or electrolytic chromium coated steel (ECCS), thinner steel sheets with thicknesses in the range of 0.1 to 0.25 mm are increasingly being used for reasons of resource efficiency. To ensure that sufficiently stable packaging can be produced from thinner steel sheets, the strength of packaging steels must be increased. Furthermore, it must be ensured that the steel sheets remain readily formable despite their lower thickness and higher strength, so that the steel sheet can be subjected to the severe deformations occurring during the production of packaging in deep drawing and stretch forming processes.

It is generally known from the prior art to increase the strength of steels by introducing unbound nitrogen dissolved in the steel. The introduction of unbound nitrogen into the steel is referred to as nitrogenizing, nitriding or nitridation and is a well-known method for solid solution strengthening of steel and steel products.

In the case of steel sheets intended for the production of packaging (these are also referred to as packaging steel), it is also known to increase the strength by nitriding the steel. For example, EP 0 216 399 B1 describes a steel sheet for packaging purposes as well as a method for its production, which has been produced from an aluminum-killed, continuously cast carbon-manganese steel and has been given an amount of unbound nitrogen by nitriding, the minimum amount of unbound nitrogen being defined as a function of a desired hardness category of the steel sheet and (for example for hardness category T61 of European standard 145-78) having an amount of unbound nitrogen of at least 5 ppm. In terms of carbon and manganese content, the chemical composition of the steel sheet disclosed therein corresponds to the usual soft steels for packaging applications and has, for example, a carbon content in the range of 0.03-0.1% by weight and a manganese content of 0.15-0.5% by weight. The steel sheet is characterized by a high yield strength in the range of 350-550 $N/mm^2$. A maximum value of 100 ppm is specified for the amount of unbound nitrogen dissolved in the steel, and the reason given for this is that at a higher content of unbound nitrogen the steel sheet can no longer be cold-rolled due to the associated increase in strength and is therefore not suitable for the intended use as cold-rolled packaging steel.

In the method for producing this known packaging steel, a steel is first continuously cast, then hot rolled, cold rolled, recrystallizing annealed and finally re-rolled. After rerolling, a thermal after-treatment is carried out in which free dislocations formed in the steel by the rerolling are fixed by the unbound nitrogen introduced by the nitriding to increase the hardness and yield strength above the values after the rerolling. The thermal after-treatment can be suitably combined with another thermal treatment of the re-rolled steel which has to be carried out anyway as part of the production of a packaging steel, such as the melting of a tin layer applied electrolytically to the surface of the steel sheet or the baking of a paint layer applied to the steel sheet surface.

Due to the upper limit for the amount of unbound nitrogen dissolved in the steel of maximum 100 ppm proposed in EP 0 216 399 B1, the strengths of this known packaging steel are limited. Higher strengths, in particular of more than 600 MPa, can be achieved without impairing the cold-rollability of packaging steels by introducing a higher quantity of nitrogen if the nitriding is carried out in two stages, namely in a first stage in which such a high quantity of nitrogen is added to the molten steel that the hot strip produced from the molten steel can still be cold-rolled, and, in a second stage, in which the cold-rolled steel sheet is further nitrided in an annealing furnace during recrystallization annealing in a nitrogen-containing gas atmosphere, in particular in an ammonia atmosphere, in order to increase the nitrogen content in the cold-rolled steel sheet beyond the initial nitrogen content of the steel melt. Such a two-stage nitriding of a packaging steel is described in EP 3 186 401 A1.

A method for the production of high-strength steel strip for the manufacture of tinplate and other packaging steels by nitriding of the steel strip is known from U.S. Pat. No. 3,219,494, in which the steel strip wound into a coil is nitrided in a batch-type annealing furnace in order to initially achieve a nitrogen-rich outer shell in the steel strip, the nitriding in the batch-type annealing furnace being effected by an ammonia gas atmosphere, and uniform distribution of the nitrogen introduced near the surface over the thickness of the steel strip by diffusion of the nitrogen when the steel sheet is heated in an inert gas atmosphere to temperatures above the recrystallization temperature, allowing the nitrogen to diffuse from the nitrogen-rich outer shell through the steel strip into its core region. Strengths in the range from 439 MPa up to 527 MPa were achieved for steel sheets with a thickness of 0.25 mm.

SUMMARY

One aspect of the invention relates to a flat steel product (steel sheet or steel strip) for the manufacture of packaging which has the highest possible strength combined with good elongation at break and good forming properties. In particular, the aim is to provide a packaging steel with strengths of at least 600 MPa and an elongation at break of at least 5%. The higher-strength packaging steel must at the same time have sufficient formability for its intended use as a packaging steel, for example in deep-drawing or stretch-forming processes, so that packaging, such as cans or beverage cans, can be produced from the flat steel product as intended. In particular, severe roughening of the surface is to be avoided during deep drawing or ironing. The packaging steel, which is present as a flat steel product, is to have the usual thicknesses in the thin sheet range of 0.5 mm or less and, in particular, in the range from 0.15 mm to 0.25 mm, this thickness of the packaging steel being produced by cold rolling. A further aspect of the invention relates to a method for producing such a steel sheet for packaging.

Accordingly, the disclosure relates to a method for producing a steel sheet for packaging and a steel sheet. Preferred embodiments of the method according to the invention and of the steel sheet are also disclosed herein.

When referring to a steel sheet, a flat steel product in the form of a sheet or strip is meant. Figures in % or ppm relating to a content or concentration of an alloying constituent of the steel or cold-rolled steel sheet refer in each case to the weight of the steel or steel sheet.

In the method according to the invention for producing a steel sheet for packaging, a cold rolling of a hot-rolled steel sheet is first carried out, which is made of a steel having a carbon content (C) by weight of 10 to 1000 ppm, the steel of the (cold-rolled) steel sheet having a recrystallization temperature ($T_R$) (essentially predetermined by the steel composition). The cold-rolled steel sheet is heated to a predetermined (maximum) heating temperature ($T_E$) in the presence of a nitrogen donor. The heating temperature $T_E$ is preferably the maximum temperature in the thermal treatment of the cold-rolled steel sheet, i.e. neither before nor during or after the thermal treatment according to the method of the invention is the cold-rolled steel sheet heated to temperatures higher than the (maximum) heating temperature $T_E$. When the cold-rolled steel sheet is heated, nitrogen from the nitrogen donor is incorporated at least into a near-surface (fringe) region of the steel sheet by diffusion of (atomic) nitrogen from the nitrogen donor into the near-surface (fringe) region. This raises the recrystallization temperature ($T_R$) of the steel in the near-surface (fringe) region by a value $\Delta T$. According to the invention, the heating temperature ($T_E$) is thereby selected so that $T_R \leq T_E < T_R + \Delta T$ applies. The heating temperature ($T_E$) is thus set in the method according to the invention so that it lies between the (original) recrystallization temperature ($T_R$) of the steel used for the production of the cold-rolled steel sheet and the recrystallization temperature ($T_R + \Delta T$) increased by the value $\Delta T$ due to the near-surface nitriding of the steel sheet in the near-surface (fringe) region.

In order to achieve at least substantially complete recrystallization of the core region (or the one layer), the temperature of the steel sheet is maintained at the heating temperature ($T_E$) for a predetermined annealing time ($t_G$) after the heating temperature has been reached. The annealing duration is preferably more than 1 second, in particular in the range from 1 to 80 seconds, preferably in the range from 1 to 10 seconds. With longer annealing times of, for example, more than 10 seconds, there is not only complete recrystallization of the core region but also a uniform distribution of the nitrogen over the thickness of the steel sheet.

By adjusting the heating temperature ($T_E$) according to the invention, a multilayer microstructure is formed over the cross-section of the steel sheet, in particular a two- or three-layer microstructure. The two-layer microstructure has an at least substantially recrystallized first layer and a second layer which is not or at least not completely recrystallized. The three-layer microstructure contains an inner, at least substantially recrystallized core region and a near-surface fringe region surrounding the core region on both sides, the fringe region not being recrystallized or at least not completely recrystallized and thus still being roll-hard (from cold rolling). When the term "fringe region" is used here, it refers to a region of the steel sheet which has a microstructure which is not or at least not completely recrystallized and which is at least partially still roll-hard. When the term "core region" is used here, this refers to a region of the steel sheet which has an at least essentially recrystallized microstructure which is softer than the roll-hard fringe region due to recrystallization.

The three-layer microstructure has the form of a "sandwich" with an at least substantially, preferably largely completely recrystallized core region and a near-surface fringe region surrounding the core region, the fringe region not being recrystallized or at least not completely recrystallized. This three-layer microstructure according to the invention is therefore also referred to hereinafter and in the drawings as a "sandwich structure".

It is therefore also an aspect of the invention to provide a steel sheet which can be used in particular for the production of packaging and is produced from a steel having a carbon content (C) by weight of from 10 to 1000 ppm and having a thickness of less than 0.5 mm, the steel sheet having an at least substantially recrystallized core region and a fringe region which surrounds the core region or adjoins the core region, is close to the surface and is not or at least not completely recrystallized.

Surprisingly, it has been shown that steel sheets with an appropriate microstructure (in particular a three-layer "sandwich structure") have a very high strength of more than 800 MPa with an acceptable ductility (elongation at break) of at least 5% for deep-drawing applications. The steel sheets according to the invention are therefore very suitable for deep-drawing applications, e.g. for the production of packaging or body parts in automotive engineering.

The value $\Delta T$ by which the recrystallization temperature in the fringe region is increased by the incorporation of nitrogen when the steel sheet is heated is preferably greater than 50° C. and particularly preferably greater than 100° C. and is in particular in the range from 100° C. to 250° C.

The value $\Delta T$ by which the recrystallization temperature in the fringe region increases due to the incorporation of nitrogen when the steel sheet is heated depends on the nitrogen content introduced into the fringe region of the steel sheet by nitriding after heating is completed, in particular, a linear relationship can be observed which can be described by $\Delta T = a \cdot \Delta N$ (ppm), where a is a proportionality constant and $\Delta N$ (ppm) is the nitrogen content in ppm (based on the weight of the steel) introduced into the fringe region during heating of the steel sheet by nitriding. Tests on samples with different nitrogen contents and otherwise the same alloy composition yielded a value of a 1.2 K/ppm, as an example. Accordingly, an increase in the recrystallization temperature in the fringe region in the range of $\Delta T \cong 10$ K to 24 K can already be achieved with a low addition of $\Delta N$ in the range of 10 ppm to 20 ppm (corresponding to 0.001 to 0.002 wt. %). At a higher nitrogen concentration of, for example, $\Delta N = 100$ ppm (corresponding to 0.01 wt. %), the (theoretically achievable) increase in the recrystallization temperature in the fringe region is already $\Delta T \cong$ approx. 120 K.

The steel sheet according to the invention can also be produced in a two-stage thermal treatment in which, in a first stage, nitriding is carried out at an intermediate temperature and, in a second stage, annealing is carried out at a heating temperature which is higher than the intermediate temperature (which is why the heating temperature is also referred to below as the annealing temperature). The intermediate temperature is lower than the recrystallization temperature $T_R$. In the two-stage process, the steel sheet is heated in the first stage from room temperature within a first heating time to the intermediate temperature $T_Z < T_R$ and held at least approximately at this temperature during a holding time $t_H$. The intermediate temperature $T_Z$ is preferably in the range from 300° C. to 600° C., particularly preferably between 400° C. and 550° C., because dissociation to atomic nitrogen on metallic surfaces begins at a temperature of about 300° C. when ammonia gas is used as the nitrogen donor. In any case, at temperatures up to about 550° C., (complete) recrystallization does not yet occur for most of the alloy compositions according to the invention. At the preferred intermediate temperatures $T_Z$ in the first stage, therefore, diffusion of the dissociated nitrogen from the nitrogen donor into the fringe region of the steel sheet does occur, but not yet recrystallization. Recrystallization of the core region does not occur until the second stage, in which the steel sheet is heated to the heating temperature (annealing temperature) $T_E$, which is equal to or greater than the original recrystallization temperature $T_R$ but below $T_R + \Delta T$. For example, the heating temperature $T_E$ is in the range of 650° C. to 800° C., depending on the value of the original recrystallization temperature $T_R$ of the steel used, and in particular about 750° C.

As in the single-stage heating of the steel sheet in the first embodiment, at least essentially only (partial) recrystallization of the core region of the steel sheet takes place in the two-stage process. Recrystallization of the fringe region nitrided in the first stage is prevented by selecting the heating temperature (annealing temperature) $T_E$ such that it is below the recrystallization temperature $T_R+\Delta T$ increased by $\Delta T$ due to the nitriding of the fringe region. Thus, the following applies: $T_R \leq T_E < T_R+\Delta T$.

In the two-stage thermal treatment, the steel sheet is thus suitably annealed in a continuous annealing furnace, first in a first stage at a lower intermediate temperature $T_Z$, which is below the (original) recrystallization temperature $T_R$ of the steel, during a holding time which is preferably in the range from 10 to 150 seconds, and in a second stage at a heating temperature (annealing temperature $T_E$) which is higher than the intermediate temperature and above the (original) recrystallization temperature of the steel, for an annealing time $t_G$, preferably in the range from 1 to 300 seconds, particularly preferably from 1 to 10 seconds, at least partially recrystallizing in the core region.

The first heating time ($t_E^1$), in which the steel sheet is heated from room temperature to the intermediate temperature in the two-stage process, is preferably in the range from 1.0 to 120 seconds, particularly preferably between 10 and 90 seconds, and can be adapted according to the desired material properties of the steel sheet according to the invention, as in the first embodiment. The holding time ($t_H$) during which the steel sheet is held at the intermediate temperature is also preferably in the range of 1.0 to 90 seconds here, particularly preferably between 10 and 60 seconds, and is also selected according to the desired material properties of the steel sheet according to the invention. After the holding time has elapsed, the steel sheet can be heated to the heating temperature $T_E$ (annealing temperature) either after cooling or immediately without cooling in the second stage in a second heating time ($t_E^2$) and held at least approximately at this heating temperature $T_E$ during an annealing time ($t_G$). During the annealing period, the nitrogen donor can optionally be present in the annealing furnace, which provides dissociated (atomic) nitrogen, so that (further) nitriding of the steel sheet can still take place during the annealing period $t_G$. This leads to an nitriding of the core region and thus to an improvement in the formability of the steel sheet, in particular to higher ductility (elongation at break). According to the invention, the heating temperature $T_E$ (annealing temperature) lies between the original recrystallization temperature $T_R$ and the recrystallization temperature increased to $T_R+\Delta T$ by the nitriding in the fringe region of the steel sheet. Thus, in the two-stage process, the following also applies here for the heating temperature $T_E$: $T_R \leq T_E < T_R+\Delta T$, with the intermediate temperature ($T_Z$) being lower than the original recrystallization temperature $T_R$.

In both, the single-stage and the two-stage process, the steel sheet is exposed at least temporarily to the nitrogen donor during heating and before the recrystallization temperature is reached. The nitrogen donor provides dissociated (atomic) nitrogen in the annealing furnace, which initially diffuses into the steel sheet near the surface and thus raises the recrystallization temperature there in the fringe region.

The steel of the cold-rolled steel sheet preferably has the following composition by weight:

Carbon, C: More than 0.001% and less than 0.1%, preferably less than 0.06%;
Manganese, Mn: more than 0.01% and less than 0.6%;
Phosphorus, P: Less than 0.04%;
Sulfur, S: less than 0.04% and preferably more than 0.001%;
Aluminum, Al: Less than 0.08%;
Silicon, Si: less than 0.1%;
optionally copper, Cu: less than 0.1%;
optionally chromium, Cr: less than 0.1%;
optionally nickel, Ni: less than 0.1%;
optionally titanium, Ti: less than 0.1% and preferably more than 0.02%;
optionally niobium, Nb: less than 0.08% and preferably more than 0.01%;
optionally molybdenum, Mo: less than 0.08%;
optional Tin, Sn: less than 0.05%;
optionally boron, B: less than 0.01%, preferably less than 0.005% and preferably more than 0.0005%;
optionally nitrogen, $N_O$: less than 0.02%, especially less than 0.016%, and preferably more than 0.001%;
Residual iron and unavoidable impurities,
wherein the average nitrogen content (N) by weight of the steel sheet after heating of the cold-rolled steel sheet in the presence of the nitrogen donor is at least 0.015% and preferably at least 0.02%.

When talking about an average nitrogen content (N) or an average nitrogen content, the nitrogen concentration averaged over the respective thickness is meant. When talking about the average nitrogen content (N) of the steel sheet, therefore, the nitrogen concentration averaged over the thickness of the steel sheet is meant.

The steel of the cold-rolled steel sheet may already have an initial nitrogen content $N_0$ of preferably more than 0.001 wt. % and less than 0.02 wt. % and particularly preferably less than 0.016 wt. %. However, a steel may also be used which, apart from unavoidable nitrogen impurities, does not contain any nitrogen. Limiting the initial nitrogen content to values of less than 0.02 wt. % enables the hot strip produced from the steel by hot rolling to be cold rolled without difficulty using the usual cold rolling equipment (rolling mills for the cold rolling of steel sheets into ultra-fine sheets). Furthermore, low initial nitrogen contents of $N_0 < 0.02$ wt. % in the steel prevent the formation of defects when casting a slab. However, in order to achieve the highest possible (average) nitrogen content in the cold-rolled steel sheet, and thereby to achieve a high solid solution strengthening, it is advantageous if the steel used to produce the hot strip already has an (initial) nitrogen content which is preferably in the range from 0.001 wt. % to 0.02 wt. % and particularly preferably between 0.005 wt. % and 0.016 wt. %.

If the steel of the cold-rolled steel sheet has an initial nitrogen content ($N_0$), the nitrogen content increases to a value above the initial nitrogen content ($N_0$) when the cold-rolled steel sheet is heated, in particular in the fringe region. If the weight-based nitrogen content ($N_S$) in the fringe region thereby increases to a value averaged over the thickness of the fringe region, which is preferably more than 50 ppm and particularly preferably between 400 and 800 ppm above the initial nitrogen content ($N_0$) of the steel, a (sometimes considerable) increase in the strength of the steel sheet is observed. Strengths of the steel sheet of more than 800 MPa at elongations at break of at least 5% can be achieved. The (average) nitrogen content ($N_S$) of the nitrogen deposited in the fringe region by the nitriding method can reach the solubility limit of nitrogen in iron of approx. 1000 ppm.

Depending on the setting of the method parameters, in particular the holding time and annealing time, and the (optional) concentration of the nitrogen donor in the annealing furnace during annealing of the steel sheet at the heating temperature (annealing temperature), the core region of the steel sheet is also nitrided to a certain extent. The nitriding of the core region may be (considerably) less. However, the core region can also be nitrided at nitrogen concentrations which at least approximately correspond to the nitrogen concentrations of the fringe region. Nitriding the core region results in a nitrogen content ($N_K$) in the core region that is at least greater than the initial nitrogen content ($N_0$) of the steel, the difference between the weight-based nitrogen content ($N_K$) in the core region and the initial nitrogen content ($N_0$) of the steel preferably being greater than 30 ppm. By nitriding the core region to a nitrogen concentration >30 ppm above the initial nitrogen content ($N_0$) of the steel (i.e., to an average nitrogen content in the core of $N_K > N_0 + 30$ ppm), sufficient ductility, in particular an elongation at break of more than 5%, can be imparted to the steel sheet, thereby achieving a formability sufficient for deep drawing applications. However, nitriding of the core region, which is preferable in terms of good formability, is not absolutely necessary to form the multilayer microstructure (in particular the three-layer sandwich structure) according to the invention.

In preferred embodiments, the steel from which the steel sheet according to the invention is made by hot rolling followed by cold rolling contains, by weight, more than 0.001% and less than 0.1% C, more than 0.01% and less than 0.6% Mn, less than 0.04% P, less than 0.04% S, less than 0.08% Al, less than 0.1% Si, and optionally an initial nitrogen content ($N_0$) of up to 0.020% and preferably 0.016% or less and the balance being iron and unavoidable impurities. After nitriding, the steel sheet preferably contains an average nitrogen content $N > N_0$ of at least 0.020%, more preferably of 0.025% or more and in particular in the range of 0.040 to 0.080% N. The tensile strength of the steel sheet is at least 800 MPa, more preferably at least 900 MPa, with a simultaneous elongation at break in the range of 2% to 10%.

The nitrogen incorporated in the fringe region during heating of the cold-rolled steel sheet can be present (up to the solubility limit) in dissolved form and/or in bound form as nitrides. In the presence of strong nitride formers in the steel, the incorporated nitrogen is at least partly present as nitrogen bound in nitrides, in particular as TiN and/or NbN and/or AlN. Depending on the concentration of nitrogen in the nitrogen donor, a surface nitride layer, in particular an iron nitride layer, can also form on the free surface of the fringe region (i.e. the surface facing away from the core).

The formation of a surface nitride layer depends essentially on the concentration of nitrogen in the nitrogen donor. When using a gas atmosphere with ammonia as nitrogen donor, for example, the formation of a nitride layer on the surface of the fringe region can be observed on a laboratory scale from an ammonia content of approx. 2-3 Vol.%. The nitride layer is very thin compared to the thickness of the fringe region and has a thickness in the range of about 10 µm or less. The volume fraction of ammonia in the gas atmosphere refers to the conditions in a laboratory test in which steel sheets were heated with an induction heater, whereby the volume fraction of ammonia in the gas atmosphere of the laboratory furnace was determined at room temperature.

A particularly sharp demarcation of the recrystallized core and the not, or at least not completely, recrystallized fringe region of the steel sheet can be observed if the steel contains a sufficient amount of strong nitride formers such as Ti, Nb, Mo and/or Al. Preferably, therefore, the steel of the cold-rolled steel sheet contains, by weight, more than 200 ppm titanium and/or more than 100 ppm niobium and/or more than 50 ppm aluminum. Particularly preferably, the sum of the weight fractions of the strong nitride formers is more than 300 ppm and preferably more than 500 ppm. Particularly, very advantageous are steel sheets with a titanium content (Ti) by weight of at least 500 ppm. The strong nitride formers, such as Ti, Nb, and/or aluminum, bind the nitrogen of the nitrogen donor incorporated in the fringe region and thus prevent the nitrogen, which is initially only incorporated near the surface, from diffusing further into the interior of the steel sheet. Thus, compared with the sheet thickness, a very thin fringe layer with a high nitrogen content is produced on the surface of the steel sheet, which leads to a strong increase in the recrystallization temperature in this fringe region. If, in accordance with the method according to the invention, the cold-rolled steel sheet is now heated to temperatures which, on the one hand, are higher than the (original) recrystallization temperature of the steel in the (not or only slightly nitrided) core region of the steel sheet and, on the other hand, are lower than the (increased) recrystallization temperature of the nitrided fringe region, only the core region is (completely) recrystallized and the fringe region remains uncrystallized due to the increased recrystallization temperature. This results in the multilayer microstructure (sandwich structure) of the steel sheet according to the invention with sharp boundaries between the fringe region and the core region. The non-recrystallized fringe region remains roll-hard and gives the steel sheet high strength. The recrystallized core region, on the other hand, gives the steel sheet good ductility and thus good formability. In the case of steel sheets which do not contain strong nitride formers, it is nevertheless possible to produce a multilayer microstructure in terms of the degree of crystallization, although the transitions between the roll-hard, non-crystallized fringe region and the at least partially recrystallized core region are less sharp.

The formation of the multilayer microstructure in relation to the degree of crystallization of the steel microstructure can be influenced by the heating time and the annealing duration. Preferably, the cold-rolled steel sheet is heated from room temperature within a heating time of 1.0 to 120 seconds (if necessary in stages, with intervening holding phases in which the temperature is kept constant during a holding time) to the heating temperature ($T_E$) and held at the heating temperature for an annealing time ($t_G$) of between 1.0 and 90 seconds. A short heating time and a short annealing duration contribute to a stronger formation of a nitrogen gradient, since with short heating times and annealing durations the nitrogen initially deposited only on the surface of the steel sheet cannot diffuse into the core region. With longer annealing times, diffusion of the nitrogen from the fringe region into the core region can be observed, with the result that the core region of the steel sheet is also nitrided.

The thickness of the non-recrystallized fringe region can be controlled by the heating time, whereby a linear relationship can be observed between the thickness of the fringe region and the heating time. Thus, an adjustable method parameter of the method according to the invention is available via the heating time, by means of which the thickness of the non-recrystallized and therefore roll-hard fringe region can be specifically adjusted. Depending on the heating time selected, the thickness of the fringe region is in the range from 5 µm to 150 µm and preferably in the range from 10 µm to 100 µm and in particular between 30 µm and 80 µm.

When the cold-rolled steel sheet is heated in the presence of the nitrogen donor, a gradient of nitrogen content ($N_S$) is established in the fringe region, with the nitrogen content decreasing from the surface to a core region of the cold-rolled steel sheet. The amount of nitrogen deposited in the fringe region can be controlled by the nitrogen concentration of the nitrogen donor.

The nitrogen donor can be formed, for example, by a nitrogen-containing gas atmosphere with atomic nitrogen in which the heating of the steel sheet takes place. When a gaseous nitrogen donor, such as ammonia gas, is used, a three-layer microstructure is formed in the steel sheet with an inner, recrystallized core and two outer, non-crystallized fringe regions surrounding the core on both sides.

It is expedient to heat the steel sheet in an annealing furnace with a nitrogen-containing gas atmosphere, in particular in a continuous annealing furnace through which the steel sheet in strip form is passed. The nitrogen-containing gas atmosphere can be provided in particular by introducing ammonia gas into the annealing furnace, whereby during heating the ammonia molecules thermally dissociate to atomic nitrogen, which can diffuse into the surface of the steel sheet. The volume concentration of the ammonia in the nitrogen-containing gas atmosphere is preferably more than 0.1%, in particular between 0.1% and 10%, and more preferably between 0.1% and 3%, in particular between 0.5% and 2.5%. Particularly preferably, the cold-rolled steel sheet is heated in an inert protective gas atmosphere which contains in particular HNx, the volume concentration of HNx in the nitrogen-containing gas atmosphere preferably being between 90% and 99.5%.

The nitrogen donor can also comprise or be formed by a nitrogen-containing liquid which is applied to one or both sides of the surface of the cold-rolled steel sheet before or during heating.

By applying a nitrogen-containing liquid as nitrogen donor to one surface of the steel sheet only on one side, a two-layer microstructure can be formed with an upper, non-recrystallized (and thus roll-hard) layer facing the liquid nitrogen donor and an underlying, recrystallized layer. The lower, recrystallized layer forms the core region and the non-recrystallized layer above forms a roll-hard fringe region.

Accordingly, the method according to the invention can be used to produce steel sheets from a steel having a carbon content (C) by weight of 10 to 1000 ppm and a thickness of less than 0.5 mm, which contain a multilayer microstructure having at least a first layer and a second layer, the first layer being at least substantially recrystallized and the second layer being not or at least not completely recrystallized. The multilayer microstructure may thereby comprise two layers, namely an at least substantially recrystallized first layer and a non-recrystallized or at least not fully recrystallized second layer. The multilayer microstructure can also be formed as a three-layer microstructure with an inner, at least substantially recrystallized core region and a near-surface fringe region surrounding the core region on both sides, the fringe region not being recrystallized or being at least not completely recrystallized and thus still being roll-hard (from cold rolling).

A three-layer microstructure with an inner, recrystallized core and two outer, non-crystallized or at least not fully crystallized fringe regions surrounding the core on both sides exhibits particularly good forming properties. The outer, roll-hard fringe region prevents larger grains from the recrystallized core region from being pressed outward to the surface of the steel sheet during forming, which on the one hand produces undesirable optical effects and on the other hand can lead to increased porosity and cracks in a coating applied to the surface of the steel sheet. A preferred embodiment of the steel sheet according to the invention therefore has a three-layer microstructure ("sandwich structure") with an inner, recrystallized core and two outer, not or at least not completely crystallized fringe regions surrounding the core on both sides.

The method according to the invention allows the production of steel sheets with a tensile strength of more than 800 MPa and preferably more than 950 MPa and an elongation at break of more than 4% and preferably more than 5%. After nitriding, the fringe region of the steel sheet preferably has a Vickers hardness of at least 220 $HV_{0.025}$ and particularly preferably of at least 300 $HV_{0.025}$. The Vickers hardness in the core region is preferably at least 100 $HV_{0.025}$ and less than 280 $HV_{0.025}$.

If the average nitrogen content ($N_S$) in the fringe region of the steel sheet, based on the weight after nitriding, is between 400 and 800 ppm, particularly high strength and hardness values can be achieved. The average nitrogen content ($N_S$) in the fringe region is the concentration of dissolved nitrogen averaged over the thickness of the fringe region. This value can reach the solubility limit of nitrogen in steel of approx. 1000 ppm.

At least in the fringe region of the steel sheet, a gradient of the nitrogen content is formed during nitriding, i.e. when the steel sheet is heated in the presence of the nitrogen donor, with the nitrogen content in the fringe region decreasing from the surface towards the core region. Depending on the concentration of nitrogen in the nitrogen donor and/or the annealing time, nitrogen buildup (i.e., an increase in nitrogen content above the initial nitrogen content No of the steel) can be observed in both the fringe region and the core region. The nitrogen buildup in the fringe region is normally greater than in the core region, i.e. the average nitrogen concentration in the fringe region is greater than in the core region after the nitrogen buildup, so that the total nitrogen content over the entire thickness of the steel sheet, e.g. in the case of a three-layer structure, is higher than in the core region. In the case of a three-layer structure ("sandwich structure"), for example, this results in a nitrogen gradient with a decreasing nitrogen content from the outside to the inside, and in the case of a two-layer structure (with an upper fringe region and a lower core region) in a nitrogen gradient with a decreasing nitrogen content from the fringe region to the core region. As a result, the fringe region of the steel sheet has a higher hardness or tensile strength than the core region. The ratio of the hardness of the fringe region to the hardness of the core region is preferably greater than 1.2 and particularly preferably greater than 1.4.

The individual layers of the two- or three-layer microstructure differ from one another not only in terms of their hardness or strength but also in terms of their texture. For example, the at least substantially recrystallized first layer and the barely or not recrystallized second layer can be distinguished from each other by the ratio of the {001} orientation and the {111} orientation in the ε fiber. The ratio of the {001} orientation and the {111} orientation in the ε fiber can be defined as a "deformation index" that characterizes the forming behavior of the steel sheet. A {111} orientation allows good formability and has a good Lankford coefficient (r-value), whereas the {001} orientation is less formable. Here, the ε-fiber is defined by the <110> vector lying parallel to the transverse direction (perpendicular to the rolling direction and to the normal direction in the strip plane of the steel strip). In the steel sheets according to the invention, in each case, the recrystallized first layer (which lies on the inside in the case of a three-layer "sandwich structure") has a deformation index of less than 0.8 and the second layer (which lies on the outside in each case in the case of a three-layer "sandwich structure") has a deformation index of more than 2.0 and, in particular, in the range from 2.0 to 5.0. Corresponding characterizations of the textures in the first and second layers can also be defined for other fibers of the microstructure, for example for the α-fiber, which is defined by the <110> vector lying in the rolling direction.

To achieve particularly high tensile strengths of 900 MPa or more, a nitrogen content generated by nitriding the steel is preferably present both in the fringe region and in the core region, which is in each case higher than the initial nitrogen content ($N_0$) of the steel, whereby the (average) nitrogen content ($N_S$) in the fringe region can be higher than the (average) nitrogen content ($N_K$) in the core region or can also be the same. The method according to the invention has been used to produce steel sheets with tensile strengths of up to 1100 MPa.

When the nitrogen content is increased both in the fringe region and in the core region, the ductility (elongation at break) of the steel sheet increases. For this reason, the ratio of the nitrogen content ($N_S$) of the fringe region to the nitrogen content ($N_K$) of the core region is preferably less than 2.8, preferably less than 2.5. Preferably, the steel sheet is nitrided in the core region to such an extent that the elongation at break of the steel sheet is more than 4%, preferably more than 5%. The method according to the invention has made it possible to produce steel sheets with elongations at break of more than 10% at tensile strengths of over 1000 MPa.

A particularly sharp demarcation of the fringe region from the core region is given if the steel in the fringe region has a degree of (re)crystallization of less than 30%, preferably less than 20%, and/or if the core region has a degree of (re)crystallization of more than 70%, preferably more than 80%.

A particularly sharp demarcation of the fringe region from the core region can be achieved if the following applies to the heating temperature ($T_E$): $T_E = T_R + \Delta T/2$. Preferably, the heating temperature $T_E$ is in the range from $T_R + \Delta T/3$ to $T_R + 2\Delta T/3$.

The scope of application of the steel sheets according to the invention is not limited to the field of packaging steels, but also extends, for example, to steel sheets for the production of automotive bodies or housings for machines.

BRIEF DESCRIPTION OF THE DRAWINGS

These and other advantages of the packaging steel according to the invention and of the manufacturing method become apparent from the embodiments described in more detail below with reference to the accompanying drawings. The drawings show:

FIGS. 7A and 7B: Microscopic cross-sectional images of the microstructure of examples of steel sheets according to the invention with a three-layer microstructure, which were nitrided in an annealing furnace in the presence of a nitrogen donor ($NH_3$-gas atmosphere) with different nitrogen concentrations (volume fraction of $NH_3$ in the gas atmosphere);

FIG. 20: Table 1;

FIG. 21: Tables 2A and 2B;

FIG. 22: Tables 3A and 3B; and

FIG. 23: Tables 4A and 4B.

DETAILED DESCRIPTION

Figure 1A:
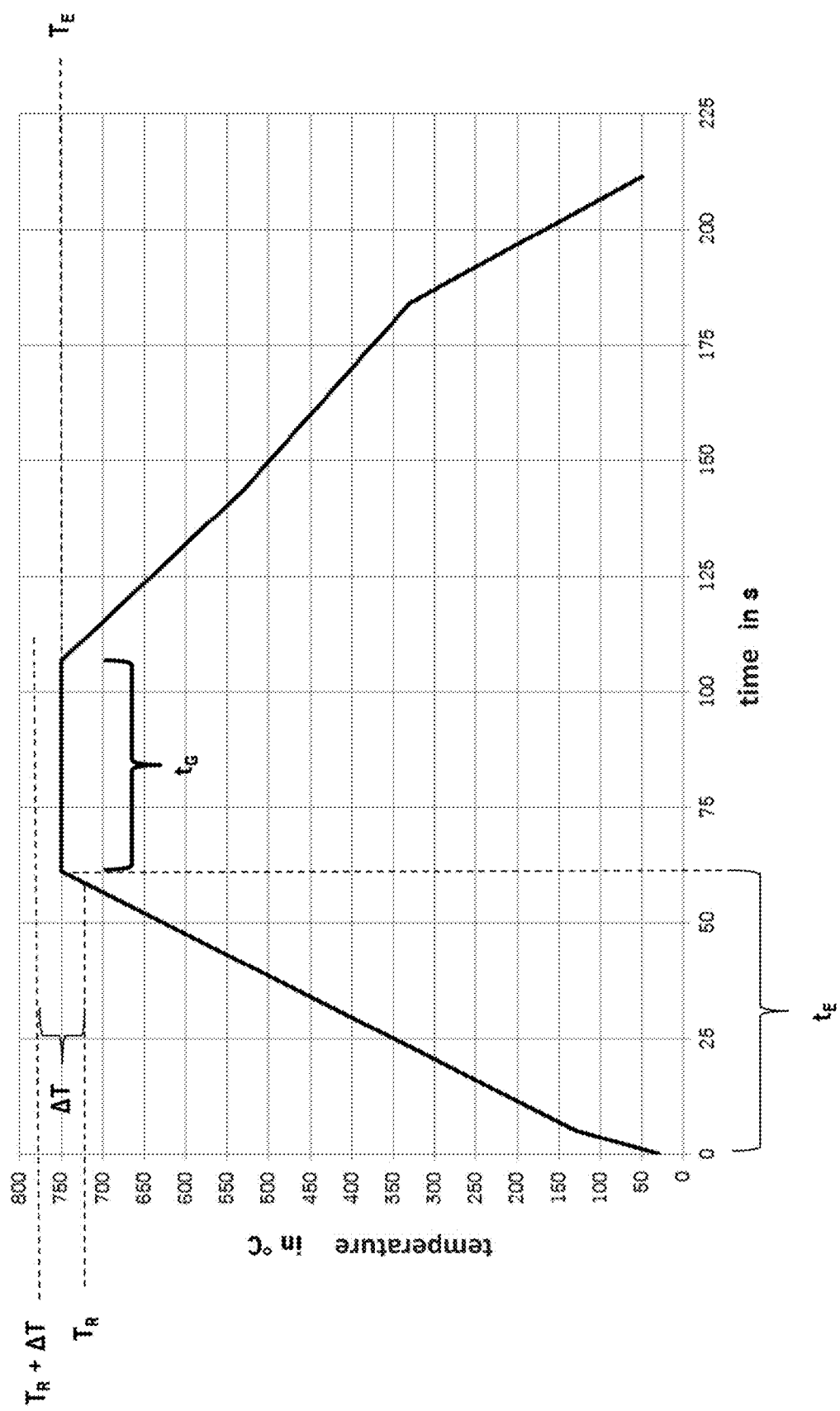
FIGS. 1A-1D: Schematic representation of temperature-time diagrams of the method according to the invention in three different embodiments, the embodiment example of FIG. 1A showing a single-stage heating and the embodiment examples of FIGS. 1B and 1C and FIG. 1D each showing a two-stage heating of the steel sheet in an annealing furnace.

Hot-rolled and subsequently cold-rolled steel sheets with a carbon content by weight of 10 to 1000 ppm are used as the starting product for the production of steel sheets according to the invention. The alloy composition of the steel expediently complies with the limits specified by standards for packaging steel (as defined, for example, in ASTM A623-11 "Standard Specification for Tin Mill Products" or in "European Standard EN 10202"), but may deviate from these, particularly with regard to the original nitrogen content, if in particular highly nitrided steel sheets with a high nitrogen content of more than 0.02% by weight are to be produced. The components of the steel from which steel sheets according to the invention can be produced are explained in detail below:

Composition of the Steel:

Carbon, C: more than 0.001% and less than 0.1%, preferably less than 0.06%; Carbon has a hardness- or strength-increasing effect. Therefore, the steel preferably contains more than 0.001 wt. % carbon. In order to ensure the rollability of the steel sheet during primary cold rolling and, if necessary, in a second cold rolling step (skin pass rolling) and not to reduce the elongation at break, the carbon content should not exceed 0.1 wt. %.

Manganese, Mn: more than 0.01% and less than 0.6%;

Manganese also has the effect of increasing hardness and strength. In addition, manganese improves the forgeability, weldability and wear resistance of steel. Furthermore, the addition of manganese reduces the tendency to red fracture during hot rolling, and manganese leads to grain refinement. Therefore, a manganese content of at least 0.01 wt. % is preferable. To achieve high strengths, a manganese content of more than 0.1 wt. %, in particular 0.20 wt. % or more, is preferable. However, if the manganese content becomes too high, this is to the detriment of the corrosion resistance of the steel. In addition, if the manganese content becomes too high, the strength becomes too high, resulting in the steel no longer being cold-rollable and formable. Therefore, the preferred upper limit for the manganese content is 0.6% by weight.

Phosphorus, P: less than 0.04%.

Phosphorus is an undesirable by-product in steels. A high phosphorus content leads in particular to embrittlement of the steel and therefore deteriorates the formability of steel sheets, which is why the upper limit for the phosphorus content is 0.04% by weight.

Sulfur, S: less than 0.04% and preferably more than 0.001%.

Sulfur is an undesirable concomitant element that deteriorates ductility and corrosion resistance. Therefore, no more than 0.04 wt % sulfur should be present in the steel. On the other hand, complex and cost-intensive measures have to be taken to desulfurize steel, which is why a sulfur content of less than 0.001 wt. % is no longer justifiable from an economic point of view. The sulfur content is therefore preferably in the range from 0.001 wt. % to 0.04 wt. %, particularly preferably between 0.005 wt. % and 0.01 wt. %.

Aluminum, Al: less than 0.08%

In steel production, aluminum acts as a deoxidizing agent in the casting method to calm the steel. Aluminum also increases scale resistance and formability. In addition, aluminum forms nitrides with nitrogen, which are beneficial in the steel sheets according to the invention. Therefore, aluminum is preferably used in a concentration of 0.005 wt % or more. On the other hand, aluminum concentrations of more than 0.08 wt. % can lead to surface defects in the form of aluminum clusters, which is why this upper limit for the aluminum content should preferably not be exceeded.

Silicon, Si: less than 0.1%;

Silicon increases the scale resistance in steel and is a solid solution hardener. In steel production, it has the positive effect of making the melt thinner and serves as a deoxidizing agent. Another positive effect of silicon on steel is that it increases tensile strength, yield strength and scale resistance. Therefore, a silicon content of 0.003 wt % or more is preferable. However, if the silicon content becomes too high, and in particular exceeds 0.1 wt. %, the corrosion resistance of the steel may deteriorate and surface treatments, especially by electrolytic coatings, may become more difficult.

optionally nitrogen, $N_0$: less than 0.02%, in particular less than 0.016%, and preferably more than 0.001%.

Nitrogen is an optional component in the molten steel from which the steel for the steel sheets according to the invention is produced. It is true that nitrogen acts as a solid solution strengthener to increase hardness and strength. However, an excessively high nitrogen content in the steel melt of more than 0.02% by weight means that the hot strip produced from the steel melt can no longer be cold rolled. Furthermore, a high nitrogen content in the molten steel increases the risk of defects in the hot strip, since at nitrogen concentrations of 0.016 wt. % or more the hot forming capability is reduced. In accordance with the invention, it is envisaged to subsequently increase the nitrogen content of the steel sheet by nitriding the cold-rolled steel sheet in an annealing furnace. Therefore, the introduction of nitrogen into the molten steel can be dispensed with entirely. However, to achieve strong solid solution strengthening, it is preferable if the steel melt already contains an initial nitrogen content of more than 0.001% by weight, particularly preferably 0.010% by weight or more.

optional: nitride formers, especially niobium, titanium, zirconium, vanadium:

Nitride-forming elements such as aluminum, titanium, niobium, zirconium or vanadium are optionally advantageous in the steel of the steel sheets according to the invention in order to bind off, at least in part, the nitrogen originally contained in the steel and the nitrogen subsequently introduced in the form of nitrides by the subsequent nitriding method in the annealing furnace. This improves the forming behavior and makes it possible to produce IF (Interstitial Free) steel sheets which are virtually free of aging. Aluminium, titanium and/or niobium are particularly preferred as steel components because, in addition to their properties as strong nitride formers, they also act as microalloying constituents to increase strength by grain refinement without reducing toughness.

Therefore, in terms of weight, the steel optionally and preferably contains
   titanium, Ti: preferably more than 0.02%, particularly preferably more than 0.02% but less than 0.1%, and/or
   Niobium, Nb: preferably more than 0.01% but less than 0.08%, and/or
   aluminum, Al: preferably more than 0.005 wt. % but less than 0.08 wt. %, and/or
   Molybdenum, Mo: less than 0.08%;
Other Optional Components:
   In addition to the residual iron (Fe) and unavoidable impurities, the steel may contain other optional constituents, such as
   optionally copper, Cu: less than 0.1%;
   optionally chromium, Cr: less than 0.1%;
   optionally nickel, Ni: less than 0.1%;
   optional tin, Sn: less than 0.05%;
   optionally boron, B: less than 0.01%, preferably less than 0.005% and preferably more than 0.0005%;
   in order to give the steel further advantageous properties, if any, which can be achieved by these additional constituents.
Manufacturing Method of the Steel Sheet:

With the described composition of the steel, a steel melt is produced, whereby in preferred embodiment examples, in order to achieve a high (average) nitrogen content of the steel sheet, the steel can already have an initial nitrogen content No by adding nitrogen to the steel melt, for example by blowing in nitrogen gas and/or by adding a solid nitrogen compound such as lime nitrogen (calcium cyanamide) or manganese nitride. In order to prevent the strength of the steel sheet produced from the steel melt from becoming too high due to nitrogen solid solution strengthening, and in order to maintain the hot formability of the steel as well as to avoid defects caused by nitrides in the slab produced from the steel melt, it is advantageous if the initial nitrogen content ($N_0$) of the steel does not exceed 0.02 wt. % and is preferably 0.016 wt. % or less.

A slab is first cast from the molten steel, which is then hot rolled and cooled to room temperature. The hot strip produced in this way has thicknesses in the range from 1 to 4 mm and is tentatively wound into a coil at a predetermined coiling temperature of 500 to 750° C., preferably in the range from 650° C. to 750° C. To produce a packaging steel in the form of a thin steel sheet in the usual sheet thicknesses of less than 0.5 mm, preferably less than 0.3 mm, the hot strip is cold-rolled, with a thickness reduction in the range from 50 to over 90%. To restore the crystal structure of the steel destroyed during cold rolling, the cold-rolled steel strip is annealed in an annealing furnace to recrystallize it. This is done, for example, by passing the steel strip in the form of a cold-rolled steel strip through a continuous annealing furnace in which the steel strip is heated to temperatures above the (original) recrystallization temperature $T_R$ of the steel. In the method according to the invention, before or preferably simultaneously with the recrystallization annealing, the cold-rolled steel strip is nitrided by heating the steel strip in the presence of a nitrogen donor. Nitriding is preferably carried out simultaneously with recrystallization annealing in the annealing furnace by introducing a nitrogen donor, in particular in the form of a nitrogen-containing gas, preferably ammonia ($NH_3$), into the annealing furnace and heating the steel sheet to a temperature above the (original) recrystallization temperature $T_R$ of the steel. The nitrogen donor is selected so that, at the temperatures in the annealing furnace, atomic nitrogen is formed by dissociation of the nitrogen donor and can diffuse (superficially) into the steel sheet. To prevent oxidation of the steel sheet surface during annealing, an inert gas atmosphere is expediently used in the annealing furnace. Preferably, the atmosphere in the annealing furnace consists of a mixture of the nitrogen-containing gas acting as a nitrogen donor and an inert gas such as HNx, the volume fraction of the inert gas preferably being between 90% and 99.5% and the remainder of the volume fraction of the gas atmosphere being formed by the nitrogen-containing gas, in particular ammonia gas ($NH_3$ gas).

FIG. 1A schematically shows a temperature-time profile of the thermal treatment for nitriding and recrystallization annealing of the steel sheet in the annealing furnace in a first embodiment example for the method according to the invention. In this first embodiment example, a single-stage heat treatment of the steel sheet is carried out in a (continuous) annealing furnace, whereby the steel sheet is simultaneously recrystallization annealed and nitrided during the (single-stage) heating. As shown in FIG. 1A, in this embodiment the steel sheet is heated from room temperature within a heating time ($t_E$) at a preferred (average) heating rate of 10 to 15° C./s to a heating temperature $T_E \geq T_R$ and held at least approximately at this temperature during an annealing time ($t_G$). The heating temperature $T_E$ corresponds to the annealing temperature at which the steel sheet is annealed to recrystallize (in certain areas) and lies between the original recrystallization temperature $T_R$ and the recrystallization temperature increased to $T_R+\Delta T$ by the nitriding in the fringe region of the steel sheet. It is therefore valid here for the heating temperature $T_E$: $T_R \leq T_E < T_R+\Delta T$.

The heating time ($t_E$) is preferably in the range from 1.0 to 120 seconds, more preferably between 10 and 90 seconds, and can be adjusted according to the desired material properties of the steel sheet according to the invention, as will be explained further below. To adjust the heating time, the heating rate at which the steel sheet is heated in the annealing furnace or the speed at which the steel sheet passes through a continuous annealing furnace can be adjusted in accordance with the desired heating time. For example, to set the preferred heating times ($t_E$) in the range of 1.0 to 120 seconds, a heating rate of 10 K/s to 80 K/s can be selected. The annealing time ($t_G$) is preferably in the range from 1.0 to 90 seconds, more preferably between 10 and 60 seconds, and is also selected according to the desired material properties of the steel sheet according to the invention. After the annealing time ($t_G$) has elapsed, the steel sheet leaves the annealing furnace and either cools passively in the environment or is cooled to room temperature by active cooling, e.g. water cooling or gas flow cooling. Suitable cooling rates are in the range from 3 K/s to 20 K/s for gas flow cooling and more than 1000 K/s for water cooling.

Figure 1B:
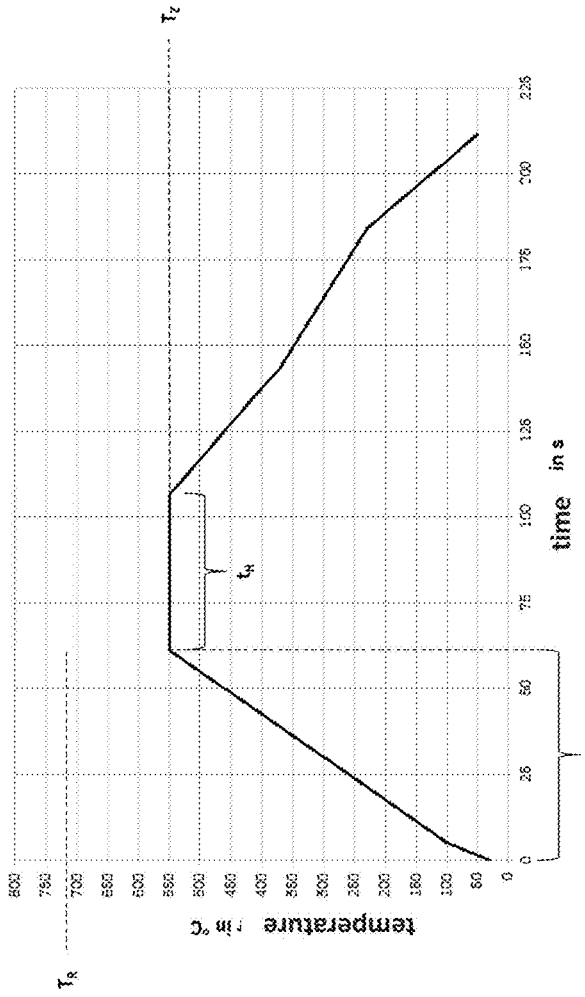
Figure 1C:
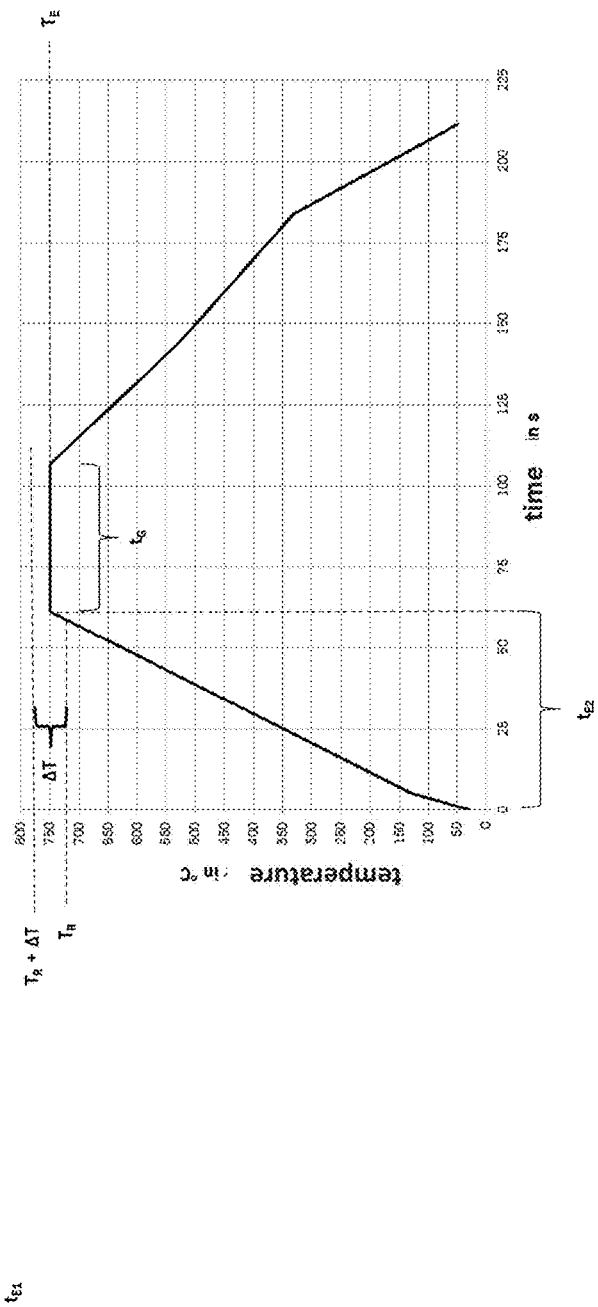
Figure 1D:
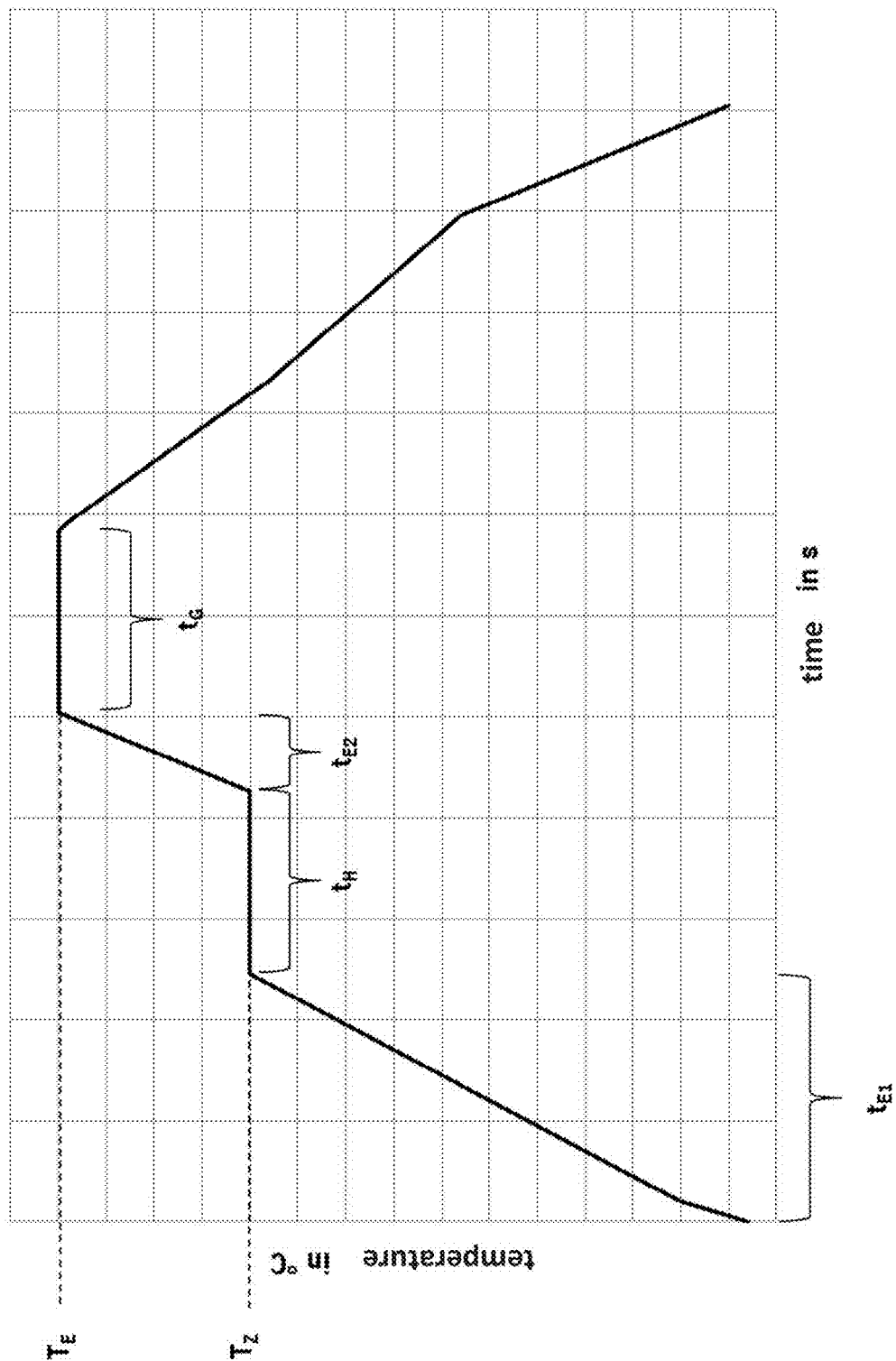

In the embodiment examples shown in FIGS. 1B and 1C and FIG. 1D on the basis of schematic temperature-time profiles of the thermal treatment, a two-stage thermal treatment of the steel sheet is carried out in the annealing furnace, whereby in a first stage a nitriding and in a second stage a recrystallization annealing of the core region takes place. In the embodiment example of FIGS. 1B and 1C, the steel sheet is heated in the first stage from room temperature within a first heating time ($t_E^1$) to an intermediate temperature $T_Z<T_R$ and held at least approximately at this intermediate temperature during a holding time ($t_H$). The intermediate temperature $T_Z$ is preferably in the range from 300° C. to 600° C., particularly preferably between 500° C. and 600° C. The first heating time ($t_E^1$) is again preferably in the range from 1.0 to 120 seconds, more preferably between 10 and 90 seconds, and can be adapted according to the desired material properties of the steel sheet according to the invention, as in the first embodiment. The holding time ($t_H$) here is also preferably in the range from 1.0 to 90 seconds, more preferably between 10 and 60 seconds, and is also selected according to the desired material properties of the steel sheet according to the invention. After the holding time has elapsed, the steel sheet leaves the annealing furnace and is either cooled passively in the environment or is actively cooled to room temperature, the cooling rates being expediently in the range from 3 K/s to 20 K/s. The steel sheet is then brought back into an annealing furnace (FIG. 1C), in particular a continuous annealing furnace, and heated in a second stage to the heating temperature (annealing temperature $T_E$) in a second heating time ($t_E^2$) and kept at least approximately at the heating temperature $T_E$ for an annealing time ($t_G$). During the annealing time ($t_G$), a nitrogen donor can optionally be present in the annealing furnace. However, the heating of the steel sheet can also take place in the first stage in a first chamber of the (continuous annealing) furnace, in which a nitrogen-containing gas atmosphere with dissociated ("atomic") nitrogen prevails, while the second stage takes place in a second chamber of the furnace, in which, e.g. a pure inert gas (such as HNx, consisting for example of 95% $N_2$ and 5% $H_2$) forms the furnace atmosphere without dissociated ("atomic") nitrogen being present. According to the invention, the heating temperature (annealing temperature $T_E$) is between the original recrystallization temperature $T_R$ and the recrystallization temperature increased to $T_R+\Delta T$ by the nitriding in the fringe region of the steel sheet. Thus, the following also applies here for the heating temperature $T_E$: $T_R \leq T_E < T_R+\Delta T$, where the intermediate temperature ($T_Z$) is lower than the (original) recrystallization temperature $T_R$.

FIG. 1D shows a modified example of a two-stage thermal treatment of the steel sheet on the basis of a schematic temperature-time diagram. As in the example shown in FIGS. 1B and 1C, the steel sheet is heated in the first stage from room temperature within a first heating time ($t_E^1$) to an intermediate temperature $T_Z<T_R$ and held at least approximately at this intermediate temperature during a holding time ($t_H$) by passing the steel sheet through a continuous annealing furnace. Unlike in the embodiment example of FIGS. 1B and 1C, however, in the embodiment example of FIG. 1D there is no cooling of the steel sheet after the holding time has elapsed, but immediately in the second stage during a second heating time ($t_E^2$) there is further heating from the intermediate temperature to the heating temperature $T_E$, which is higher than the intermediate temperature $T_Z$ and lies between the original recrystallization temperature $T_R$ and the recrystallization temperature increased to $T_R+\Delta T$ by the nitriding in the fringe region of the steel sheet.

Heating up to the heating temperature $T_E$ can expediently take place within a very short second heating time ($t_E^2$) of less than 5 seconds by means of an induction heater arranged in the downstream region of the continuous annealing furnace. As in the second embodiment example of FIGS. 1B and 1C, in the third embodiment example of FIG. 1D, the heating temperature $T_E$ is: $T_R \leq T_E < T_R+\Delta T$, where the intermediate temperature ($T_Z$) is lower than the (original) recrystallization temperature $T_R$. This third embodiment is characterized by improved efficiency compared to the second embodiment because cooling of the steel sheet at the end of the first stage and reheating at the beginning of the second stage from room temperature is omitted. The efficiency can be further improved if induction heating is used for heating in the second stage, with which very fast heating with high heating rates can be realized. The third embodiment can usefully be carried out in a continuous annealing furnace with two chambers arranged one behind the other, with the heating of the steel sheet in the first stage taking place in a first chamber of the continuous annealing furnace in which there is a nitrogen-containing gas atmosphere with dissociated ("atomic") nitrogen, and the steel sheet is heated in the second stage by means of the induction heater arranged in the second chamber of the continuous annealing furnace, wherein in the second chamber either a pure inert gas (such as HNx) forms the furnace atmosphere without dissociated ("atomic") nitrogen being present therein, or here also, further nitriding takes place in a gas atmosphere with atomic nitrogen. The induction heater is conveniently arranged in the downstream region of the second chamber.

The (initial) recrystallization temperature $T_R$ of the steel depends on the composition of the steel and is typically in the range of 550 to 720° C. Accordingly, the heating temperature $T_E$ is preferably in the range 630° C. to the Curie temperature of about 768° C. The preferred upper limit value of the Curie temperature of 768° C. for the heating temperature $T_E$ results from apparatus-related reasons, since induction heating can only be carried out up to this limit temperature. If heating in the annealing furnace is carried out conductively or by thermal radiation, heating can also be carried out to heating temperatures $T_E$ above the Curie temperature.

When the cold-rolled steel sheet is heated in the annealing furnace, nitrogen from the nitrogen donor is initially deposited only in a fringe region of the steel sheet close to the surface, as atomic nitrogen from the nitrogen donor diffuses into the fringe region. The nitrogen diffused into the fringe region can either be interstitially deposited in the iron lattice of the steel or is bound as nitride, especially if strong nitride formers such as Al, Nb, Ti, or B are present in the steel. The incorporation of the nitrogen raises the recrystallization temperature ($T_R$) of the steel in the fringe region by a value $\Delta T$. This increase in the recrystallization temperature ($T_R$) in the fringe region is shown in FIGS. 1A to 1D with $\Delta T$.

According to the invention, the heating temperature ($T_E$) or the annealing temperature is now selected so that $T_R \leq T_E < T_R+\Delta T$ applies. The heating temperature ($T_E$) or the annealing temperature is thus set in the method according to the invention so that it lies between the (original) recrystallization temperature ($T_R$) of the steel used for the production of the cold-rolled steel sheet and the recrystallization temperature ($T_R+\Delta T$) increased by the value $\Delta T$ due to the near-surface nitriding of the steel sheet in the fringe region. By setting the heating temperature ($T_E$) (or the annealing temperature) in this way, recrystallization only takes place in a core region of the steel sheet adjoining the outer fringe region towards the inside, in which at least initially no nitrogen has (yet) been incorporated during annealing and simultaneous nitriding of the steel sheet. The heating temperature ($T_E$) is only above the recrystallization temperature ($T_R$) in the core region, and in the fringe region, where the recrystallization temperature has been increased by $\Delta T$ due to the incorporated nitrogen, the heating temperature ($T_E$) is below the recrystallization temperature, which has been increased to $T_R+\Delta T$. Therefore, a three-layer microstructure in the form of a "sandwich" is formed over the cross-section of the steel sheet with an at least essentially, preferably largely completely recrystallized core region and a near-surface fringe region surrounding the core region, the fringe region not being recrystallized or at least being not completely recrystallized (which is why this three-layer microstructure is also referred to as a "sandwich microstructure").

Figure 2A:
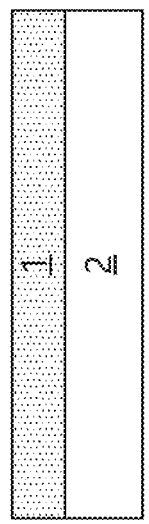
FIGS. 2A and 2B: Schematic representation of the microstructure of the steel sheet according to the invention in a first embodiment with a three-layer microstructure (FIG. 2A) and in a second embodiment with a two-layer microstructure (FIG. 2B)

The microstructure resulting from the heating of the steel sheet in the presence of the nitrogen donor therefore comprises an at least essentially completely recrystallized core region 2 and a fringe region 1 surrounding the core region 2 on both sides, as shown in the schematic sectional view of a steel sheet according to the invention in FIG. 2A. The fringe region 2 is not recrystallized or at least not completely recrystallized and therefore remains in the as-rolled condition of the cold-rolled steel sheet. The respective degree of recrystallization of the core region 2 and the fringe region 2 can be adjusted via the heating temperature ($T_E$) and the annealing time ($t_G$). A sharp demarcation of the core region 2 and the fringe region 1 can be achieved, for example, if the annealing time ($t_G$) is greater than 10 seconds and the heating temperature ($T_E$) is between $T_R+\Delta T/3$ and $T_R+2\Delta T/3$. Similarly, the thickness of the fringe region 1 can be adjusted by the method parameters of the heating temperature ($T_E$) and the heating time ($t_E$), which will be explained in more detail below.

Figure 2B:
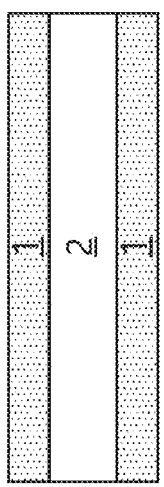

The method according to the invention can also be used to produce two-layer microstructures with an at least largely completely recrystallized core region 2 and an overlying, roll-hard fringe region 1 if, instead of a gaseous nitrogen donor, a liquid or solid nitrogen donor is used which is applied to only one side of the steel sheet. In this embodiment of the method according to the invention, the liquid or solid nitrogen donor is applied to one side of the steel sheet before annealing and the steel sheet thus coated on one side with the nitrogen donor is then annealed in the annealing furnace in the manner described above. The microstructure shown schematically in FIG. 2B is formed with a lower region (core region) 2 and an upper region (fringe region) 1, the lower region (core region) being recrystallized and the upper region (fringe region) remaining uncrystallized and thus roll-hard. Nitrogen-containing liquids which can be used as nitrogen donors include nitrogen compounds dissolved in water, such as guanidine or guanidine hydrochloride, urea or melamine. Aqueous solutions of these nitrogen-containing compounds can be applied, for example by means of a $CO_2$ cartridge, as a fine spray mist on one or both sides of the surface of the steel sheet, which can then be dried before the steel sheet thus coated with a dry coating of the nitrogen-containing compound is brought into the annealing furnace for annealing. The annealing furnace can be a batch-type annealing furnace or a continuous annealing furnace, preferably with an inert gas atmosphere, e.g. 100% HNx. The nitrogen concentration of the nitrogen donor thus applied to the surface of the steel sheet can be adjusted via the concentration of the nitrogen-containing compound in the aqueous solution or via the thickness of the dried layer (dry coating).

The nitrogen donor can also be applied as a nitrogen-containing powder or granules to one or both sides of the steel sheet. Nitrides or nitrates, for example, can be used as nitrogen-containing powder or granules. Melamine resins can also be used as nitrogen donors, which can be applied to the surface of the steel sheet as a viscous mass.

After production of the steel sheets according to the invention, they can be coated with conversion or protective layers on one or both sides in the usual way, in particular by electrolytic tin plating or chromium plating.

Examples

Examples of embodiments of the steel sheet and the method according to the invention are explained below.

Steel sheets with a thickness of 0.22±0.01 mm were produced by hot rolling and subsequent cold rolling from steel melts with the alloy compositions A, B and C listed in Table 1 shown in FIG. 20 (the ppm figures refer to the weight fraction of the alloy constituents in the steel from which the cold-rolled steel sheet was produced). The cold-rolled steel sheets were subjected to thermal treatment in a laboratory furnace with an induction heater in an inert gas atmosphere containing ammonia at different method parameters in terms of the heating temperature $T_E$, the heating time $t_E$, the annealing time $t_G$, and the volume concentration of ammonia in the furnace. The atmosphere in the continuous annealing furnace was composed of the ammonia gas and, as the remainder, HNx protective gas, with the volume fraction of ammonia in the gas atmosphere of the furnace determined at room temperature and maintained constant by influx of ammonia during the thermal treatment of the steel sheet. When the experiments are carried out on a commercial scale in a continuous annealing furnace, the ammonia concentrations required for nitriding will probably shift to higher values, since at the high temperatures in a continuously heated continuous annealing furnace only part of the total ammonia atmosphere is effectively available for nitriding the steel sheet due to dissociation and recombination effects of the ammonia to atomic and molecular nitrogen.

The microstructure of the heat-treated steel sheets was examined microscopically (cold-embedded, ground, polished and etched with 3% nitric acid after Nital). After cooling, the furnace heat-treated steel sheets were subjected to a second cold rolling step (skin pass) with a reduction level of 1.5%. Table 2A shown in FIG. 21 lists, for various examples of steel sheets with alloy composition A from Table 1, the parameters of the heat treatment, such as the heating time $t_E$, the annealing time $t_G$, the heating temperature $T_E$ and the volume concentration of ammonia $NH_3$ (%) in the gas atmosphere of the furnace.

Figure 3B:
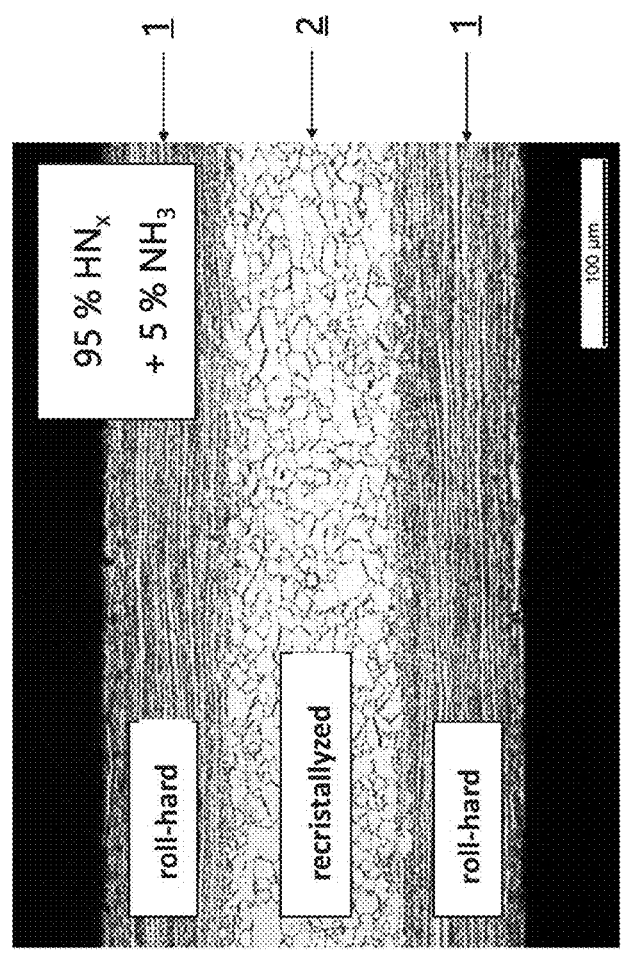
FIGS. 3A and 3B: Comparison of microscopic cross-sectional images of the microstructure of a conventional steel sheet (FIG. 3a) and a steel sheet according to the invention with a three-layer microstructure (FIG. 3B)
Figure 3A:
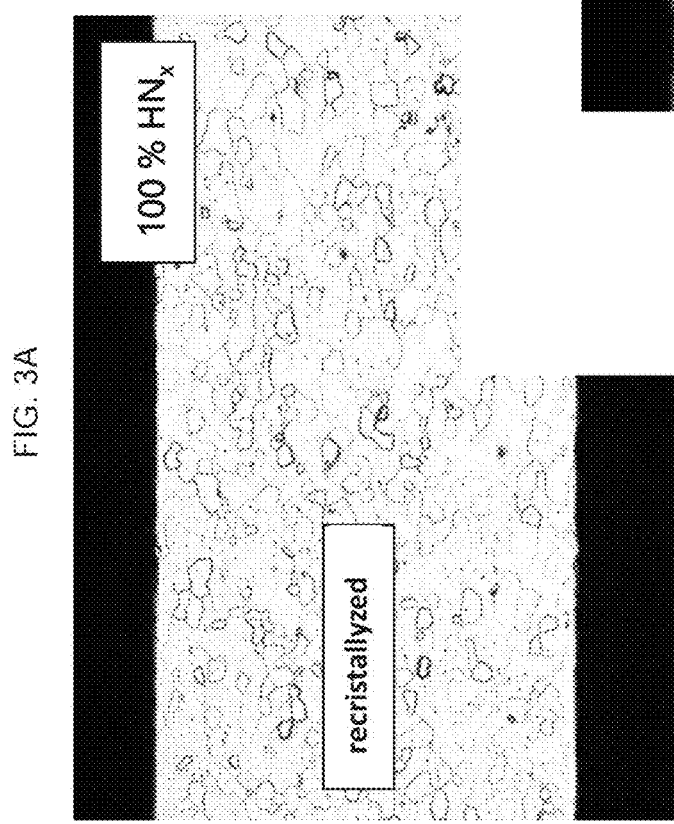

FIGS. 3A and 3B show a comparison of the microstructures of heat-treated steel sheets of the examples in Table 2A, with FIG. 3A showing the example "fully recrystallized" and FIG. 3B the example "sandwich structure" according to the invention. It is clear that in the "sandwich structure" example treated in accordance with the invention, a three-layer microstructure ("sandwich structure") has been formed with a recrystallized core region 2 and fringe regions 1 surrounding it on both sides, the fringe region 1 in each case having a thickness of approx. 65 µm. In the comparative example 2, on the other hand, the steel sheet is largely completely recrystallized over the entire thickness of the steel sheet.

Figure 4A:
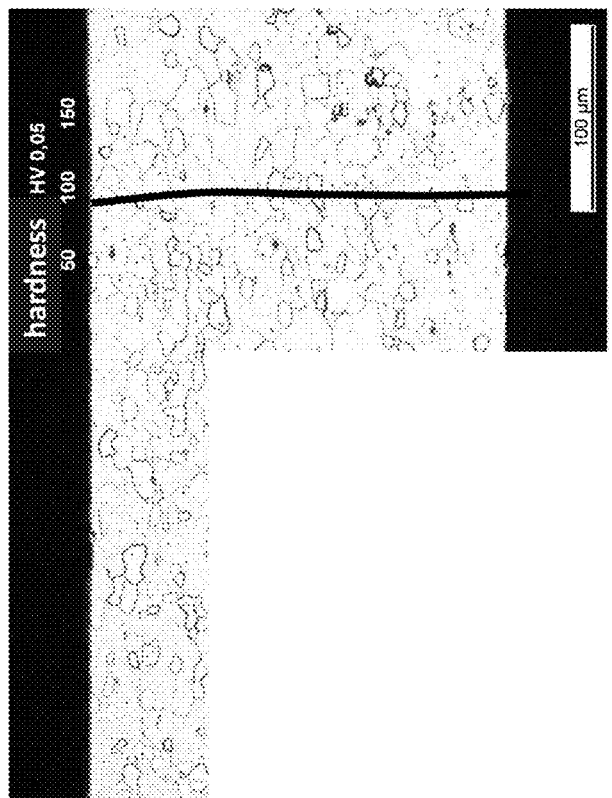
FIGS. 4A and 4B: Comparison of microscopic images of the microstructure of a conventional steel sheet (FIG. 4A) and a steel sheet according to the invention with a three-layer microstructure (FIG. 4B), in each case showing the cross-sectional variation of Vickers hardness (HV 0.05) over the thickness of the steel sheet.
Figure 4B:
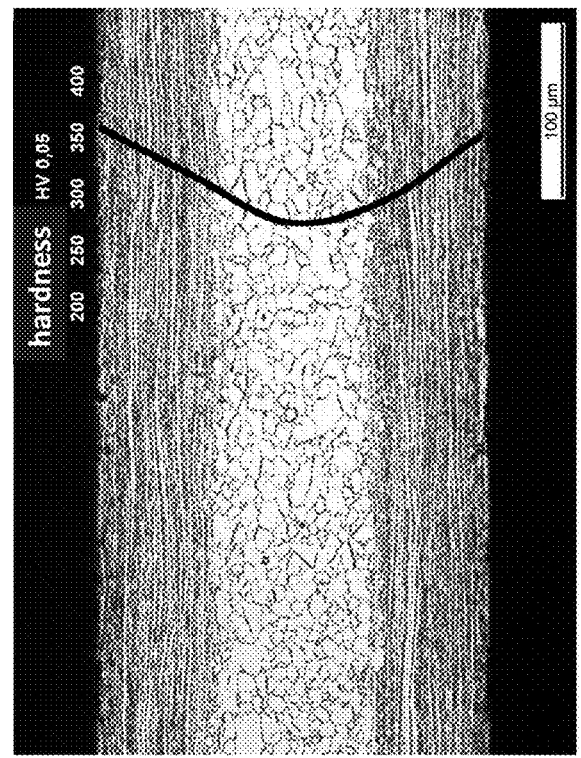

The tensile strength Rm, the 0.2% proof stress (Rp0.2) and the 0.5% proof stress (Rp0.5) and the elongation at break A, the uniform elongation Ag and the hardness (according to Vickers and Rockwell) were measured on the specimens from Table 2A. The course of the hardness was also measured over the profile of the steel sheets (in the thickness direction). The properties determined on the measured specimens of the examples from Table 2A are listed in Table 2B (also shown in FIG. 21) and exemplary hardness profiles over the thickness of the steel sheets are compared in FIGS. 4A and 4B. It can be seen that the sample according to the invention ("sandwich structure") of FIG. 4B has a clearly pronounced, inverted Gaussian profile with a hardness maximum of approx. 350 HV 0.005 at the surfaces of the steel sheet and a minimum Vickers hardness of approx. 260 HV 0.05 in the center of the steel sheet profile. In contrast, the sample of the comparative example not according to the invention in FIG. 4A (completely recrystallized)

has a largely constant hardness value of approx. 100 HV 0.05 over the entire thickness of the steel sheet. It thus follows that the heat-treated steel sheet of the example of FIG. 4B according to the invention has a substantially higher hardness both in the fringe region 1 and in the core region 2 than the sample of the comparative example of FIG. 4A, as well as a clear hardness gradient with a hardness decreasing from the outside towards the core region 2. This gradient of hardness across the thickness of the steel sheet is due to the steel sheet of the example according to the invention being nitrided both in the fringe region 1 and in the core region 2 with a nitrogen content decreasing from the outside towards the center of the steel sheet, as well as to the (complete) recrystallization of the core region 2 during the thermal treatment in the annealing furnace. The hardness profile of the specimen of the example according to the invention shown in FIG. 4B and the comparison of the absolute hardness values of this specimen in the fringe and core regions with the measured hardness of the specimen of the comparative example shown in FIG. 4A show that in the specimen according to the invention there has been a nucleation (increase in nitrogen content) both in the core region 2 and in the fringe region 1 and a resulting increase in hardness and strength due to solid solution strengthening. The increase in the nitrogen content in the fringe region 1 was so high that the recrystallization temperature in the fringe region was raised by a value $\Delta T$ to a final value of $T_R+\Delta T$, which was above the heating temperature $T_E$, with the result that no recrystallization or only incomplete recrystallization took place in the fringe region 1. The fringe region 1 of the specimen of example 1 is therefore still roll-hard and exhibits a high hardness with a hardness maximum at the surface of the steel sheet.

Figure 5:
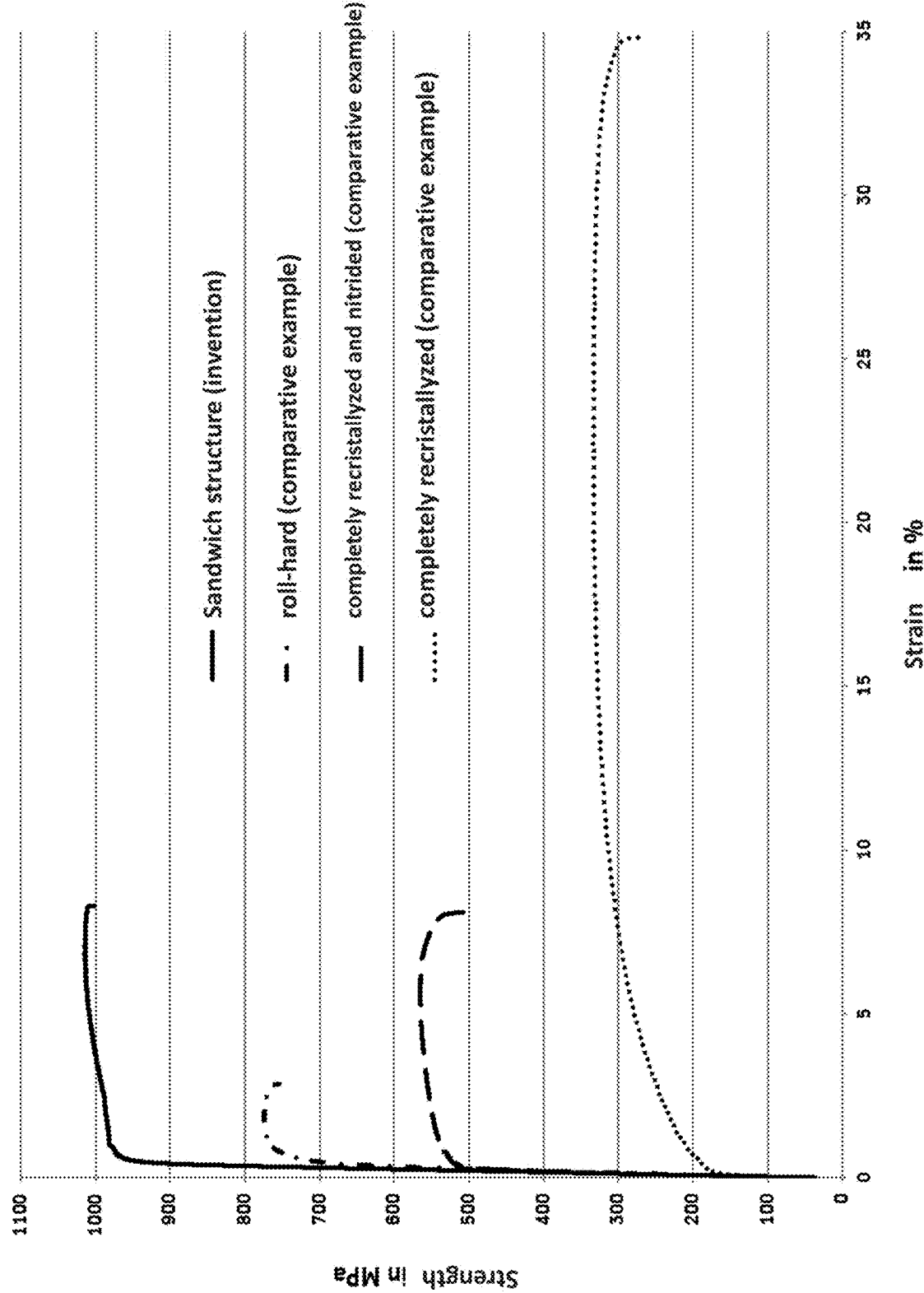
FIG. 5: Comparison of the stress-strain diagram measured on a comparative example (conventional steel sheet) and on an embodiment of the steel sheet according to the invention.

Strength and strain measurements were made on the specimens of the examples in Table 2A. FIG. 5 shows examples of the stress-strain diagrams of the specimens. The specimens compared in FIG. 5 are cold-rolled steel sheets with a composition according to Example A of Table 1 and were subjected to a thermal treatment in an annealing furnace after cold rolling as follows:

"Sandwich structure" (sample according to the invention): one-step heating of the sample by the method according to the invention in an annealing furnace to a heating temperature $T_E$ of 750° C., with a heating time $t_E$ of 62 seconds and an annealing time $t_G$ of 45 seconds (according to the temperature-time diagram of FIGS. 1A-1D), wherein (at least) during the heating time a nitrogen donor was present in the annealing furnace;

"roll-hard" (comparative example): no annealing;

"completely recrystallized" (comparative example): Annealing in a standard annealing method at an annealing temperature of 750° C. without a nitrogen-containing gas atmosphere (i.e. without nitrogen donor, esp. without ammonia addition in the annealing furnace and therefore without nitrogen buildup in the annealing furnace);

"completely recrystallized and nitrided" (comparative example): initially recrystallizing annealing at an annealing temperature of 750° C. without a nitrogen-containing gas atmosphere (i.e. without a nitrogen donor) in the annealing furnace, whereby the sample was first completely recrystallized and nitrided in the annealing furnace with an ammonia atmosphere, whereby the nitriding in the annealing furnace was analogous to the "sandwich structure" sample, but in the completely recrystallized state.

FIG. 5 shows that the specimen according to the invention ("sandwich structure") has a much higher tensile strength of >1000 MPa (compared to <800 MPa of the comparative examples) at about the same elongation at break A of approx. 7.8% compared to the specimens of the comparative examples ("roll-hard", "fully recrystallized", "fully recrystallized and nitrided on").

The method according to the invention can thus be used to produce (nitrided) steel sheets characterized by a very high strength of more than 800 MPa combined with good elongation at break of more than 5%, preferably more than 7%. Such steel sheets can be excellently processed in forming processes for the production of stable packaging such as cans and beverage cans as well as parts thereof such as (tear-off) lids.

The exact composition of the microstructure, in particular the thickness of the fringe region and the nitrogen content in the fringe region and in the core region generated by the nitriding method in the continuous annealing furnace, as well as the gradient of the nitrogen content across the thickness of the steel sheet can be influenced by varying the method parameters. Therefore, the properties of the steel sheets produced by the method according to the invention can be tailored to different applications.

Figures 6A, 6B:
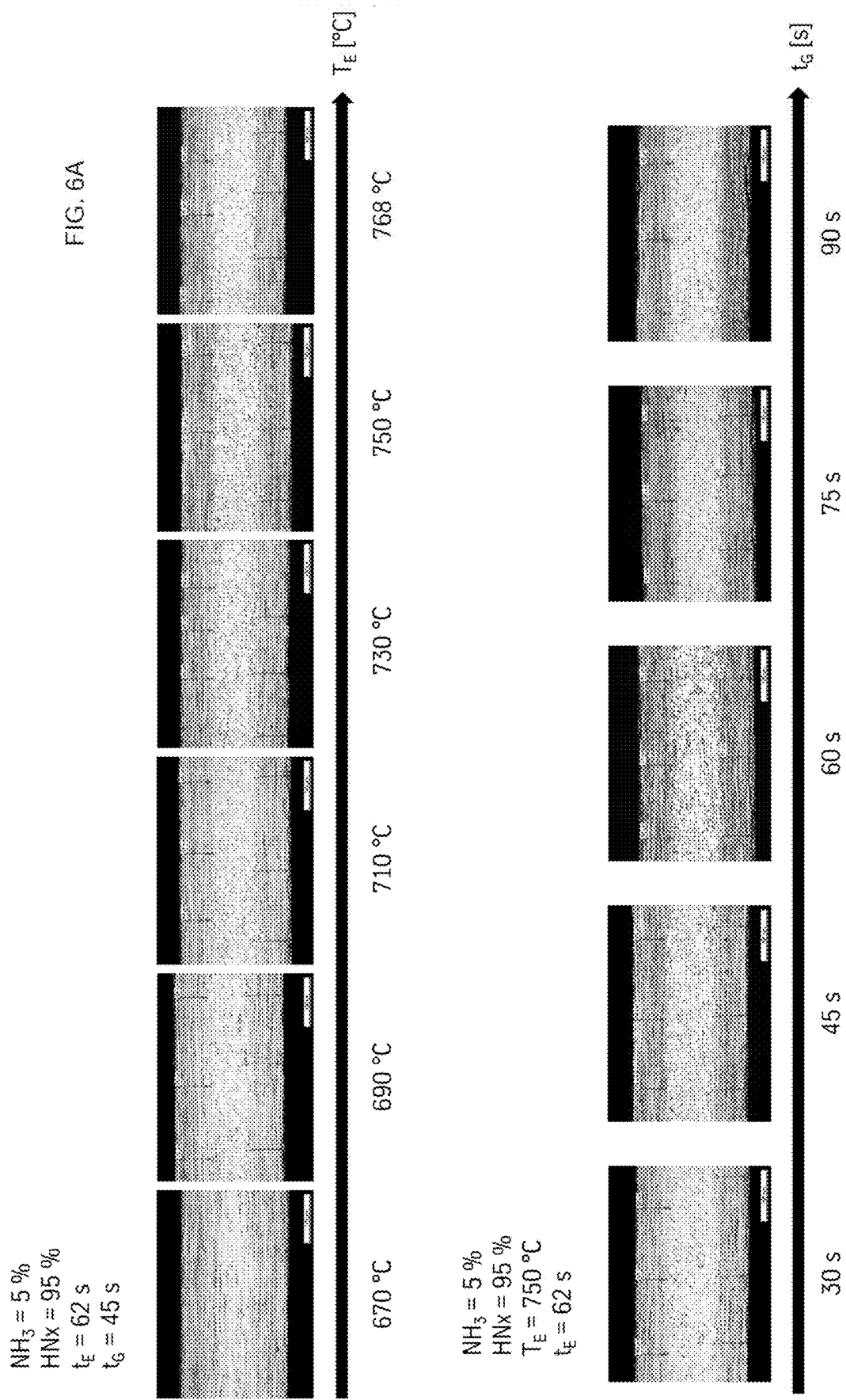
FIGS. 6A and 6B: Microscopic cross-sectional images of the microstructure of embodiments of steel sheets according to the invention with a three-layer microstructure, which were nitrided at different heating temperatures ($T_E$, FIG. 6A) or with different annealing times ($t_G$, FIG. 6B)

To illustrate this, FIGS. 6A and 6B and FIGS. 7A and 7B show the microstructures of samples of steel sheets according to the invention which have each been heat treated by varying a method parameter in the single-stage method described above. FIG. 6A shows a sequence of microstructures of samples (identical in terms of composition) which have been heated to a different heating temperature $T_E$ (at a constant heating time of $t_E$=62 seconds and a constant annealing time of $t_G$=45 seconds) and FIG. 6B shows a sequence of microstructures of samples which have been kept at the heating temperature for different lengths of time at a constant heating temperature of $T_E$=750° C. and a constant heating time of $t_E$=62 seconds (i.e. have had different annealing times $t_G$ for the same heating time).

From the images of the microstructure in FIG. 6A it can be seen that a multilayer microstructure with a roll-hard fringe region 1 and a recrystallized core region 2 is formed as soon as the heating temperature of $T_E$ is higher than the recrystallization temperature $T_R$ of the steel. In the first image from the left of FIG. 6A, the heating temperature $T_E$ is still below the recrystallization temperature $T_R$ and therefore no recrystallization takes place over the entire thickness of the steel sheet. In the second picture from the left, $T_E>T_R$ and recrystallization only occurs in the core region. In the fringe region 1, the (original) recrystallization temperature $T_R$ was raised by $\Delta T$, which is why the heating temperature $T_E$ there is below the increased recrystallization temperature $(T_R+\Delta T)$ and no recrystallization has occurred. The thickness of the fringe region in the second image from the left of FIG. 6A is about 67±5 µm. If the heating temperature $T_E$ is further increased up to the preferred upper limit of 768° C. (Curie temperature, up to which temperature induction heating can be used), the microstructure does not change significantly as long as the heating temperature $T_E$ is lower than the increased recrystallization temperature $(T_R+\Delta T)$ in the fringe region, i.e. no recrystallization takes place, i.e. a three-layer microstructure is formed with a fringe thickness of the roll-hard, non-recrystallized fringe region of approx. 67±5 µm (images 3 to 6 of FIG. 6A).

FIG. 6B shows the influence of the annealing time on the formation of the microstructure. The composition of the three-layer microstructure is largely independent of the annealing time $t_G$, i.e. in particular the fringe thickness of the roll-hard fringe region remains approximately the same. In the examples shown in FIG. 6B with an annealing time between 30 seconds and 90 seconds, the fring thickness is approx. 67±5 µm. However, at higher annealing times, it can be observed that nitrogen diffuses from the fringe region into the core region. As a result, on the one hand the transition between the fringe region and the core region becomes less sharp and on the other hand, due to solid solution strengthening caused by the incorporation of nitrogen in the core region, there is an increase in strength, so that at higher annealing times with $t_H$>40 seconds a noticeable increase in strength can also be observed in the core region, as is also clear from the comparison of the hardness measurements of FIGS. 4A and 4B.

The nitrogen concentration of the nitrogen donor (ammonia content in the gas atmosphere of the annealing furnace) has a much greater influence on the microstructure. FIGS. 7A and 7B show images of the microstructure of samples of steel sheets according to the invention that have been heat treated in a single-stage method using a different volume concentration of the ammonia gas in the gas atmosphere of a laboratory furnace with induction heating (with otherwise identical parameters, namely $T_E$=750° C., $t_E$=62 seconds and $t_H$=45 seconds). The volume fraction of ammonia in the gas atmosphere of the laboratory furnace has been determined at room temperature. As shown in FIG. 7A, already at an ammonia concentration of 0.5% by volume, a three-layer microstructure is obtained with a recrystallized core region and a fringe region surrounding it on both sides, the fringe thickness here being approx. 34±3 µm (FIG. 7A, top left). With increasing ammonia content, the fringe thickness initially increases linearly and then saturates at an ammonia content of approx. 2-3 vol. % at a fringe thickness of approx. 65 µm (see FIG. 8). A further increase of the ammonia content no longer leads to an expansion of the fringe region. At an ammonia content of 10% by volume, the fringe thickness of approx. 61 µm (FIG. 7A, far right) is even somewhat below the maximum value of approx. 66 µm observed at an ammonia content of 2.5% by volume.

Figure 8:
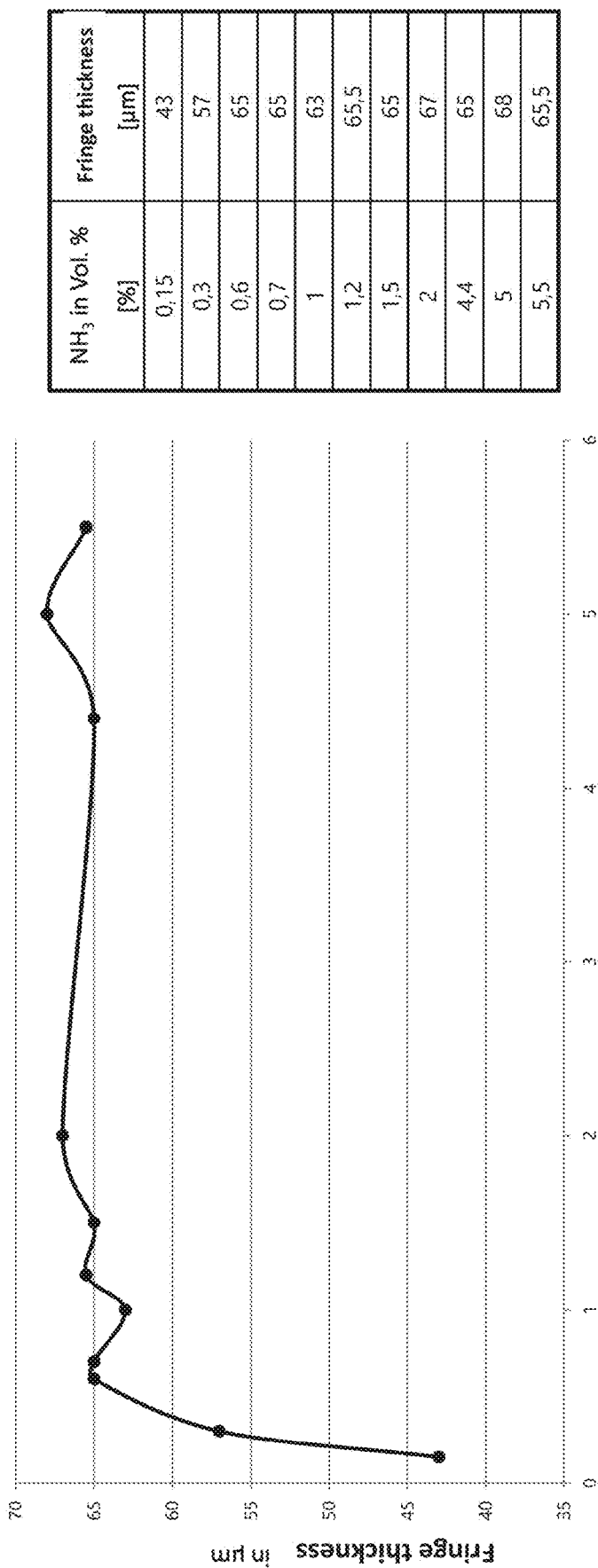
FIG. 8: Representation of the course of the thickness of the fringe region formed in the steel sheet when nitriding on steel sheets using the method according to the invention, as a function of the nitrogen concentration of the nitrogen donor used for nitriding (ammonia content of the gas atmosphere)

A closer look at the micrographs with higher resolution reveals that at ammonia concentrations >2 vol. % a very thin nitride layer, in particular an iron nitride layer, has formed on both sides of the surface of the steel strip. The nitride layer can be seen in the enlarged images of the microstructures in FIG. 7B. In particular, in the images at the high ammonia contents ≥5 vol. %, it can be seen that the surface nitride layer is composed of several superimposed individual layers. The individual layers are probably different phases (γ-, γ'-, ε-phase) of the iron nitrides. The formation of the (iron) nitride layer on the surface of the steel sheet influences the fringe thickness of the fringe region. Up to the formation of a surface nitride layer, the fringe thickness increases with increasing nitrogen content of the nitrogen donor (ammonia gas) and as soon as a nitride layer is formed (from approx. 2% by volume ammonia content), the fringe region no longer extends further toward the center of the steel sheet, as can be seen in FIG. 8. Thus, in the method according to the invention, the structure of the multilayer structure and, in particular, the fringe thickness of the fringe region can be adjusted via the nitrogen content of the nitrogen donor. As soon as a surface nitride layer forms, it continues to grow in thickness as the ammonia content increases. However, the fringe region no longer increases in size, i.e. the fringe region is limited to a maximum thickness of approx. 65 µm, which is already reached at an ammonia content of about 2% by volume.

The undesirable surface layer of (iron) nitride is conveniently removed by chemical analysis before the composition of the steel sheets is determined (in accordance with the normative specification in Clause 4.4.1. of DIN EN ISO 14284). The alloy composition of the tested specimens listed in Table 1 was determined in a corresponding manner after removal of the nitride surface layer in order to avoid falsification of the measured nitrogen content of the specimen.

Figure 9:
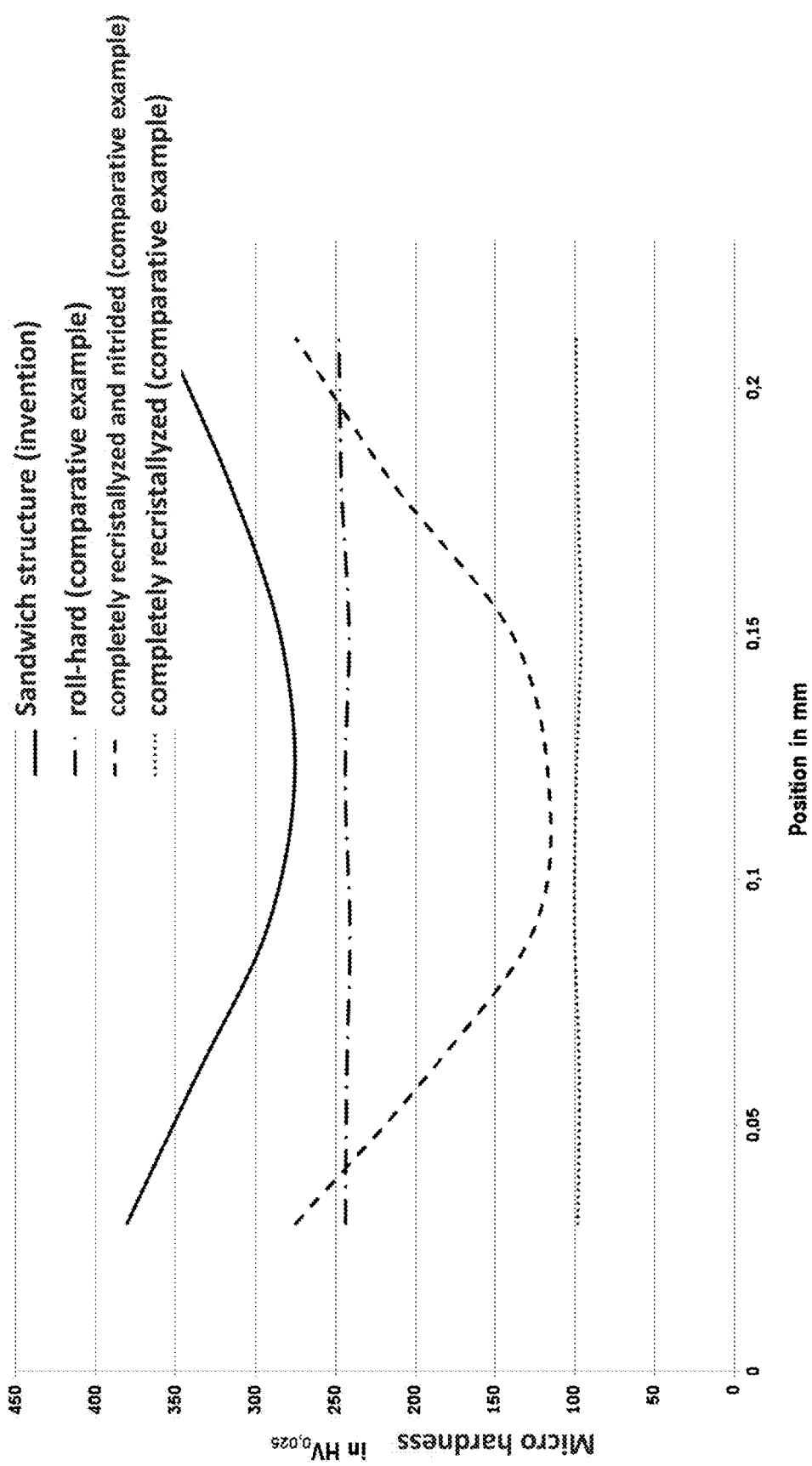
FIG. 9: Representation of the course of the microhardness measured on 0.25 mm thick steel sheets according to the invention over the cross-section of the steel sheet.

FIG. 9 shows hardness profiles of specimens with the alloy composition according to Example A of Table 1, where the specimens have been thermally treated after cold rolling like the corresponding examples of FIG. 5 (see page 32, last paragraph).

FIG. 9 shows the course of the microhardness over the sheet thickness. It has been shown that there is a correlation between the microhardness and the nitrogen content for all nitrided specimens. In the non-nitrided condition, the sample with the alloy composition according to Example A of Table 1 has a hardness around 250 HV in the as-rolled condition and around 100 HV in the fully recrystallized condition. The hardness increases in both textures due to the nitriding, as can be seen from the hardness curves of the samples "sandwich structure" (sample according to the invention) and "completely recrystallized and nitrided".

From a comparison of the sample according to the invention ("sandwich structure") with the sample "completely recrystallized and nitrided", it can be seen from FIG. 9 that the course of the microhardness over the sample cross-section (thickness of the sample) differs. In particular, it can be seen that the sample according to the invention ("sandwich structure") has a higher microhardness over the entire sample cross section. In particular, in the core region of the specimen, the microhardness is significantly higher compared to the specimen "completely recrystallized and nitrided", with the difference in microhardness of these two specimens being even greater in the core region than in the outer edge areas (fringe region). From this it can be seen that in the specimen according to the invention ("sandwich structure") not only the fringe region but also the core region has been nitrided, because an increase in hardness can be observed in the center of the specimen due to the nitrogen apparently also introduced in the core region. In contrast, in the "completely recrystallized and nitrided" sample (which has undergone the same nitriding cycle as the "sandwich structure" sample, but in the already completely recrystallized state), only a slight increase in microhardness is observed in the core region compared to the "completely recrystallized" sample, which suggests that in the "completely recrystallized and nitrided" sample, hardly any nitrogen has been incorporated during nitriding in the core region of this sample. It can be seen from this that the diffusion of nitrogen during nitriding in the annealing furnace is strongly dependent on the microstructure of the steel, and that a non-recrystallized microstructure leads to faster diffusion of nitrogen into the core region of a steel sheet. In the case of a (completely or partially) recrystallized microstructure, on the other hand, the diffusion method is slowed down, which means that in the case of an already recrystallized steel sheet, nitrogen is essentially only incorporated in the outer edge areas when it is nitrided in the annealing furnace.

In the method according to the invention, therefore, the diffusion of nitrogen into the steel sheet during nitriding in the annealing furnace is much more efficient than in the case of fully recrystallized steel sheets due to nitriding in the roll-hard region. In particular, the method according to the invention can be used to produce steel sheets with a three-layer microstructure ("sandwich structure") which have an increased nitrogen concentration both in the core region and in the outer edge areas (fringe region) and thus a significantly increased overall microhardness and tensile strength.

Figure 15:
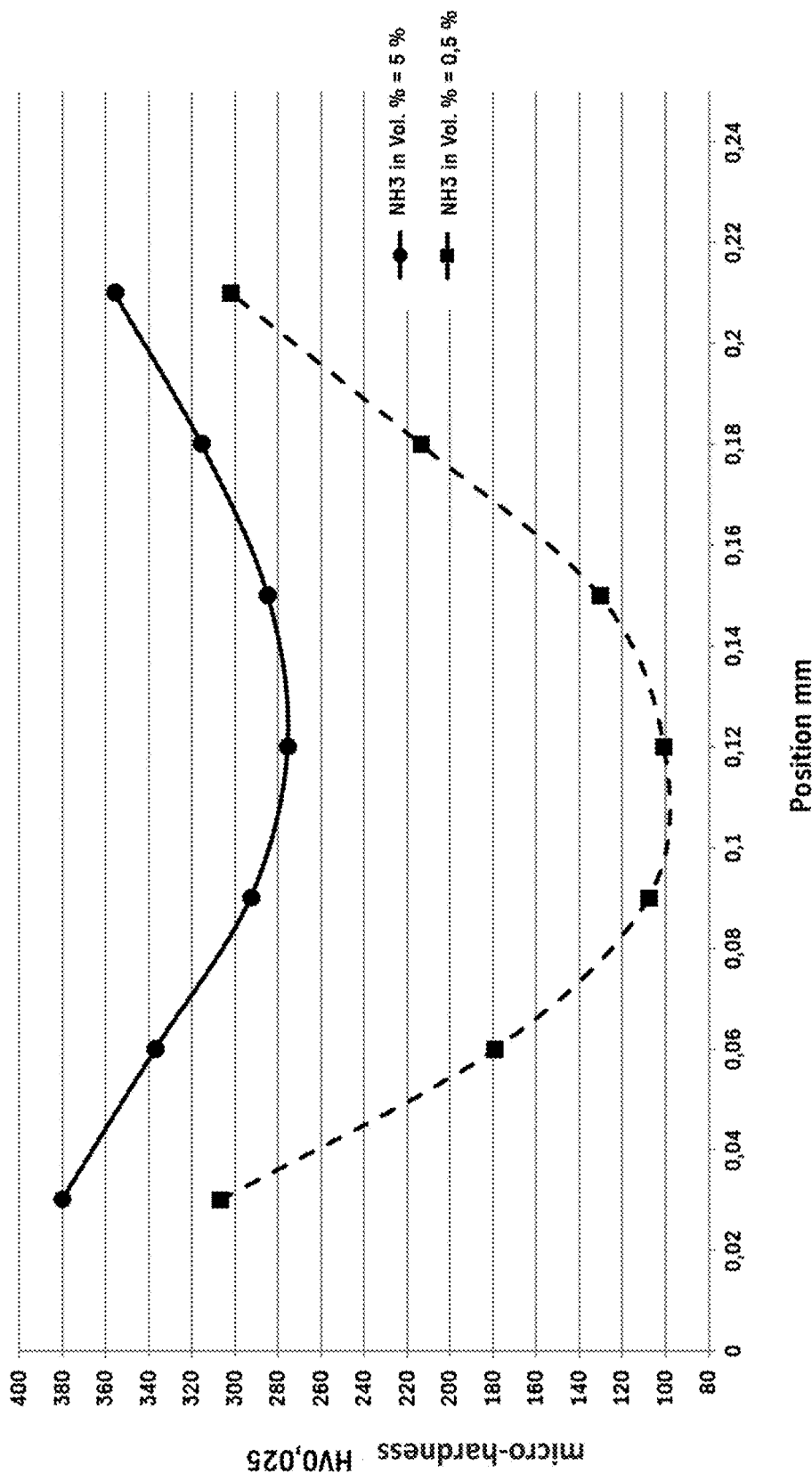
FIG. 15: Representation of the course of the microhardness over the cross-section of embodiments of steel sheets according to the invention which have been nitrided in the annealing furnace with different high ammonia contents ($NH_3$ in vol. %)

In the method according to the invention, the nitrogen content of the nitrogen donor can therefore also be used to control the average total hardness or tensile strength of the steel sheet as well as the hardness profile over the cross-section of the steel sheet. By comparing hardness profiles of samples of steel sheets according to the invention which have been nitrided in the annealing furnace with different ammonia contents, as shown in FIG. 15, it can be seen that the average hardness averaged over the thickness of the steel sheet increases with increasing nitrogen content (ammonia content) of the nitrogen donor. In the case of the sample nitrided according to the invention ("sandwich structure"), a hardness profile is formed in each case—irrespective of the ammonia content—over the thickness of the steel sheet, with a maximum hardness at the surface and a minimum hardness value in the center, as can be seen from FIG. 9 for the "sandwich structure" sample. At a low ammonia content of, for example, 0.5% by volume, the hardness in the center of the steel sheet, i.e. in the middle of the core region, is approximately the same as that of a completely recrystallized, non-nitrided sample (comparative example "completely recrystallized" from FIG. 9). This shows that at a low ammonia content of 0.5% by volume, noticeable nitriding occurs only in the surface-near fringe region, but not in the core region. At a higher ammonia content, in particular 1% by volume or more, nitrogen is incorporated both in the fringe region and in the core region, with the result that the core region is also hardened by solid solution strengthening. The ratio of the average hardness values in the fringe region and in the core region is thereby about 3:1 or more for the low ammonia contents (of <1 vol. %) and about 1.3 or less for the higher ammonia contents (of ≥5 vol. %). A sharp demarcation of the core region from the fringe region can be achieved if the ratio of the average hardness values in the fringe region and in the core region is 1.2 or more. Preferably, the ratio of the average hardness values in the fringe region and in the core region is 1.4 or more.

Figure 12:
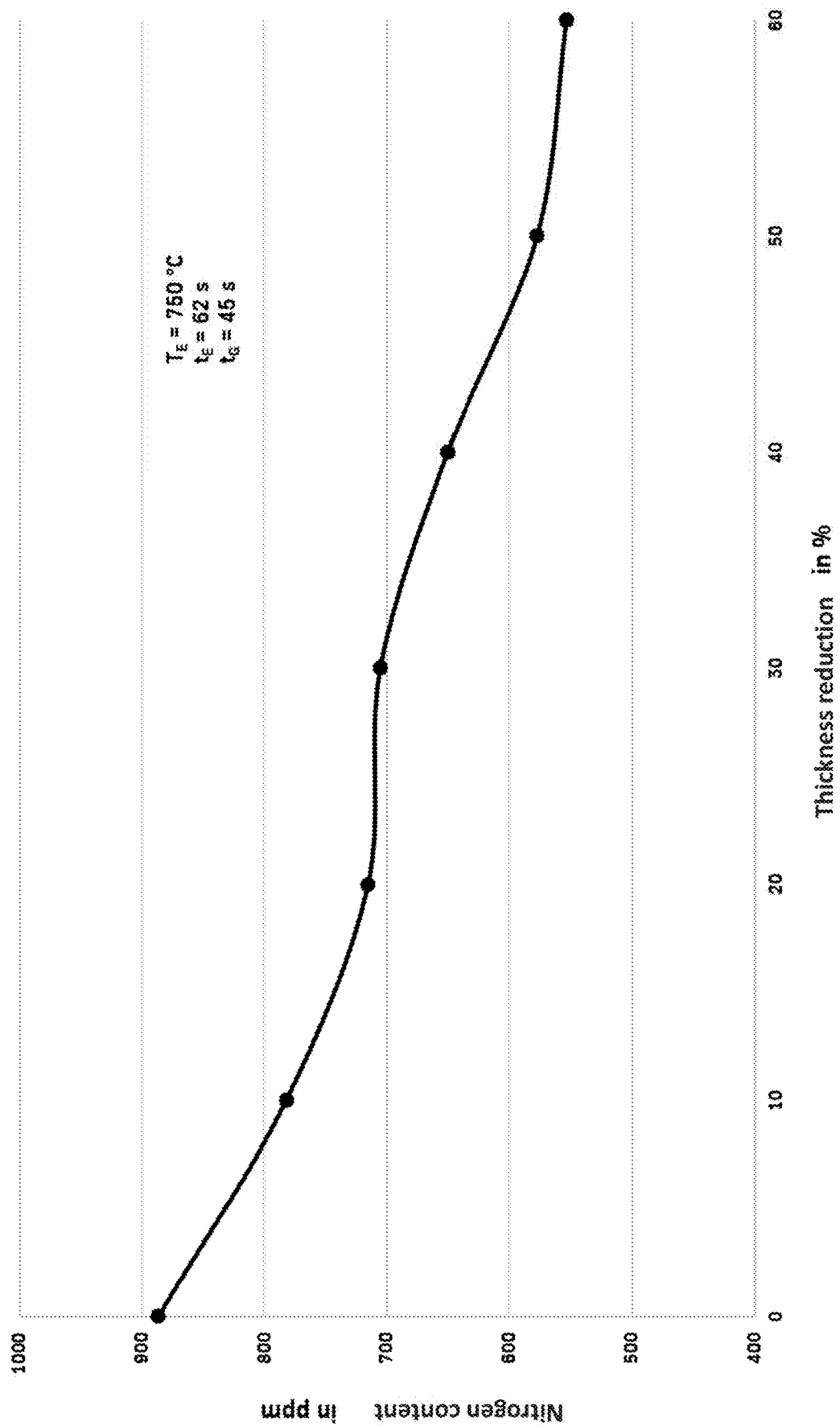
FIG. 12: Gradient curve of the nitrogen content over the cross-sectional profile of a steel sheet according to the invention.

The hardness profiles of FIG. 9 also show that the average nitrogen content of the specimen according to the invention generated by the nitriding method in the annealing furnace is significantly higher in the fringe region ($N_S$) than in the core region. It can be assumed that the increase in hardness is due solely to the solidification of the mixed crystal and thus to the increased nitrogen content caused by the nitriding. Based on this, it can be concluded from the hardness profiles of FIG. 9 that the ratio of the average nitrogen content of the fringe region ($N_S$) to the average nitrogen content of the core region ($N_K$) is also about 1.3 for the higher ammonia contents (of ≥5 vol. %) and about 3:1 or more for the low ammonia contents (of <1 vol. %). This could be confirmed by measurements of the profile of the nitrogen content of samples of steel sheets according to the invention under successive pickling of the layer near the surface. A clearly pronounced gradient of the nitrogen content over the thickness of the steel sheet was found, with nitrogen contents based on weight of approx. 900 ppm at the surface of the steel sheet (in which case the surface iron nitride layer was removed before measuring the nitrogen content) and nitrogen contents of approx. 550 ppm in the core region (FIG. 12). The nitrogen concentration in the nitrogen donor can thus be used to adjust the degree of nitriding in the fringe region and in the core region.

Figure 10:
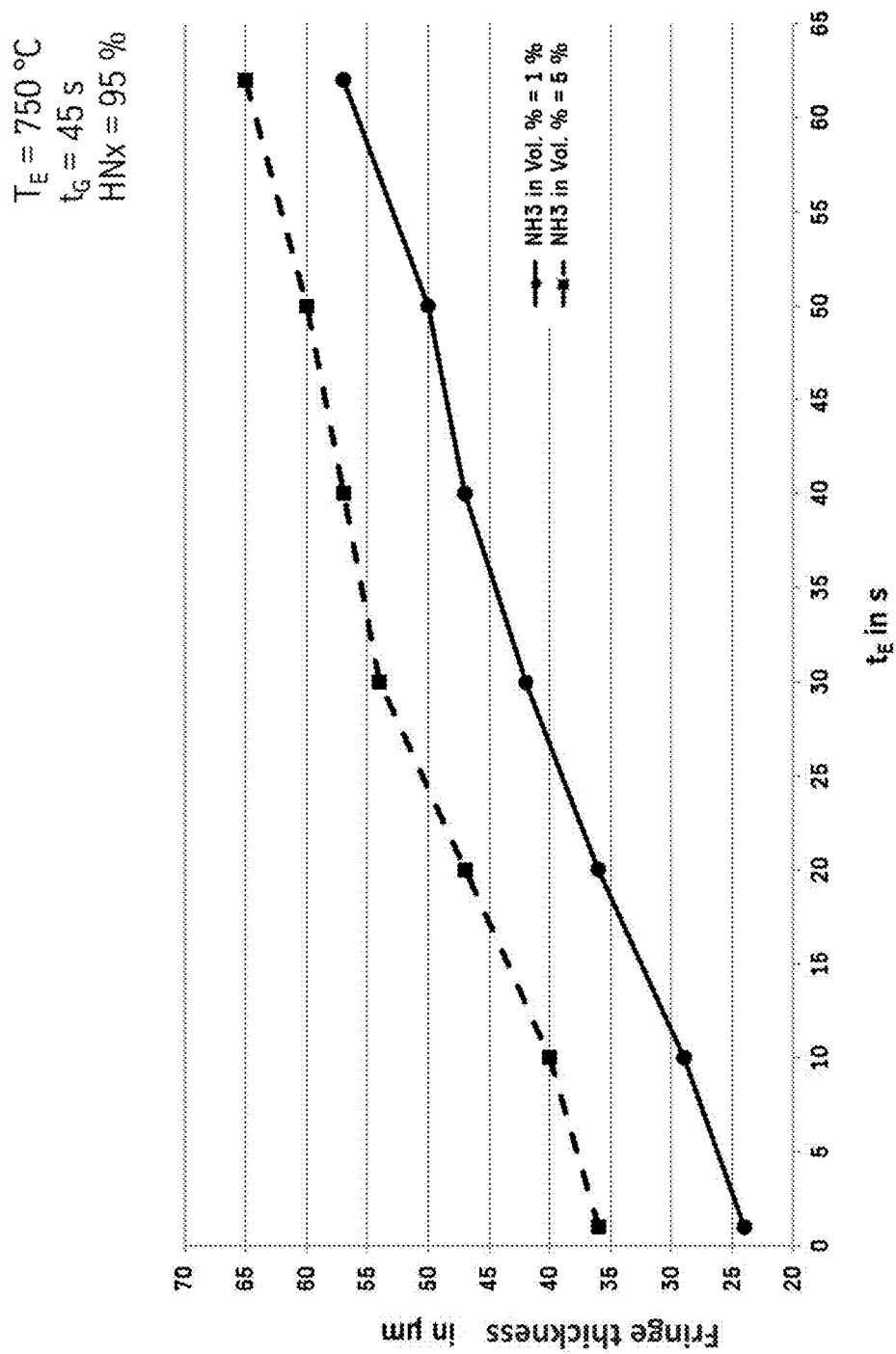
FIG. 10: Representation of the course of the thickness of the fringe region formed in the steel sheet when nitriding steel sheets using the method according to the invention, as a function of the annealing time ($t_G$) for which the steel sheet has been kept at the heating temperature ($t_E = 750°$ C.)

The thickness of the fringe region can be controlled by the heating time $t_E$. This is clearly shown in the diagram in FIG. 10, which shows the dependence of the fringe thickness on the heating time $t_E$ at two different ammonia contents (1 vol. % and 5 vol. %). In both cases, an approximately linear increase of the fringe thickness with increasing heating time can be observed. The straight lines of the linear curve have approximately the same slope at different ammonia contents and are only shifted by approx. 10 µm in the absolute value of the fringe thickness, as can be seen in FIG. 10. As a result, the composition of the microstructure and in particular the thickness of the outer, roll-hard fringe region can be adjusted in a defined manner via the method parameter of the heating time. The heating time method parameter can be very easily controlled by the heating rate or the speed at which the steel sheet is passed through the continuous annealing furnace, so that a specific and precise setting of the desired fringe thickness can be achieved. The fringe thickness, in turn, can be used to set the average hardness of the steel sheet (averaged over the entire thickness) or its tensile strength as well as its formability (via the thickness of the core region and its average nitrogen content).

Figure 11:
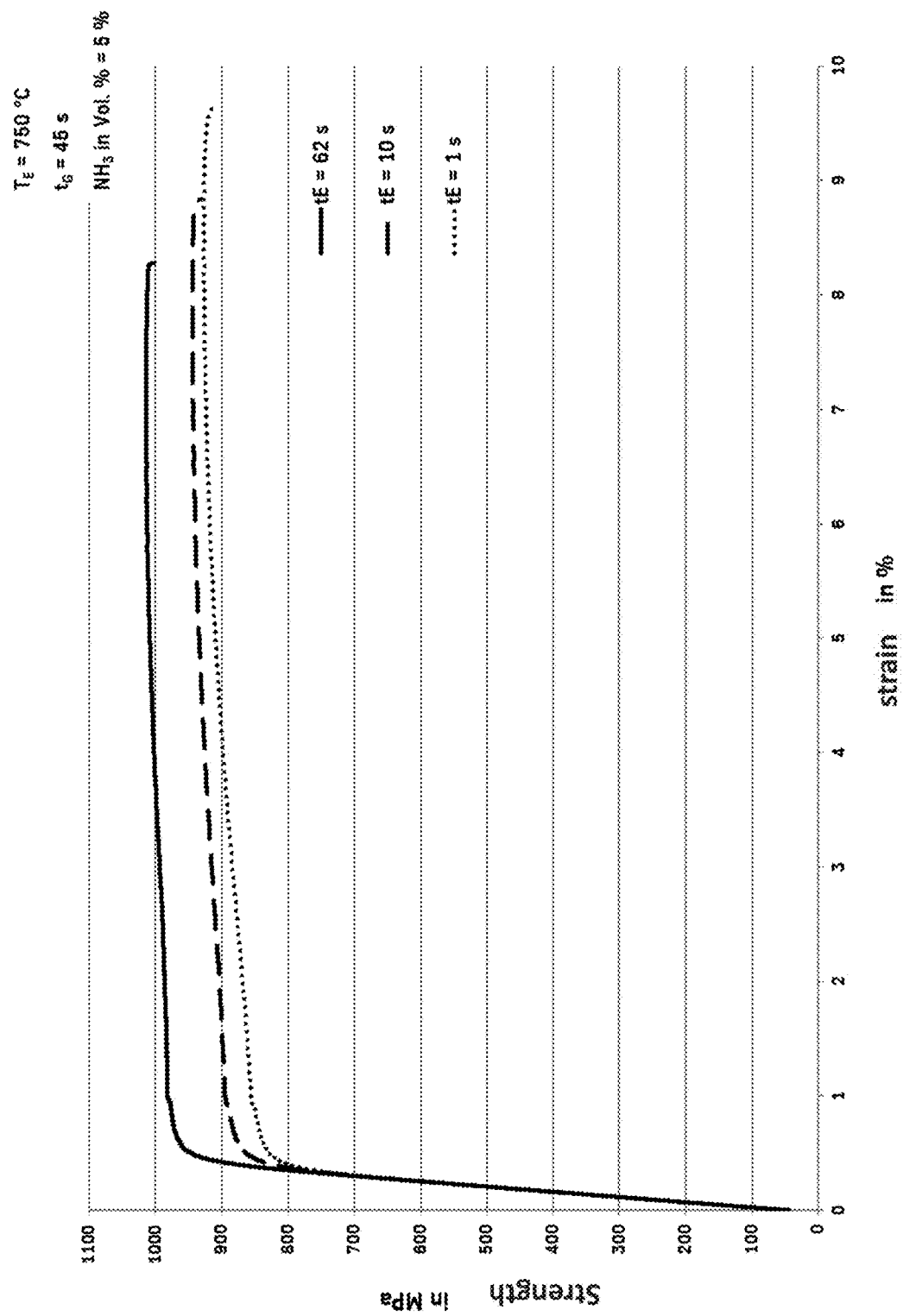
FIG. 11: Representation of the course of strength versus elongation, of steel sheets according to the invention, which have been nitrided with the method according to the invention at a heating temperature $t_E = 750°$ C. and different heating times.

FIG. 11 shows strength-elongation curves of specimens nitrided according to the invention with composition A of Table 1. The specimens were heated to a heating temperature of $t_E$=750° C. with different heating times $t_E$ and kept at the heating temperature with the same annealing time of $t_G$=45 seconds in a 5% ammonia atmosphere. The material properties obtained in this way are shown in Table 3A (FIG. 22) and graphically in FIG. 11. It can be seen that by increasing the heating time, the strength Rm can be increased, but that the elongation at break A is (slightly) reduced. By varying the heating time $t_E$, it is therefore possible to set a value for tensile strength and elongation at break that is optimized for the particular application, or the working capacity for cold forming that results from this as the product of tensile strength and elongation at break. With the steel sheets according to the invention, values for the working capacity W=Rm (in MPa) A (in %) of more than 5000 MPa % can be achieved.

FIG. 12 shows the gradient of the nitrogen concentration over the thickness of a steel sheet (with a composition according to example A from Table 1) is shown. In order to record the nitrogen profile over the cross-section of the steel sheet resulting from nitriding at 750° C. in a 5% ammonia atmosphere with a heating time of 62 s and an annealing time of 45 s, the sample was pickled in hydrochloric acid in stages and the nitrogen content was measured over the entire remaining sheet thickness by means of hot carrier gas extraction.

Figure 13:
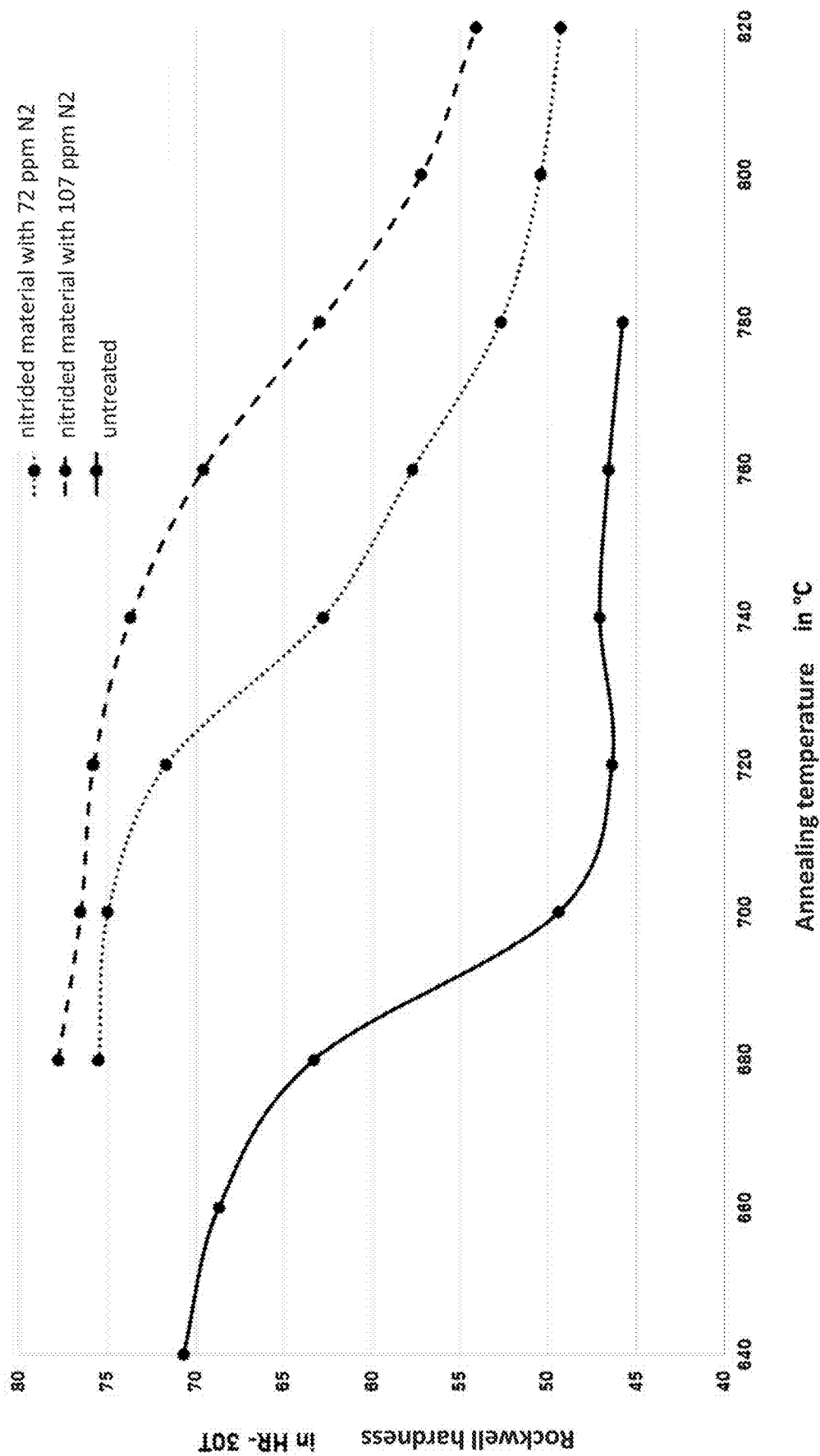
FIG. 13: Illustration of the influence of the nitrogen content of steel sheets nitrided at different levels on the hardness and recrystallization temperature using hardness diagrams as a function of the heating temperature during recrystallization annealing.

The diagram in FIG. 13 shows the influence of the nitrogen content of steel sheets with different nitrogen contents on the hardness and recrystallization temperature by means of hardness diagrams as a function of the heating temperature during recrystallization annealing. The diagram in FIG. 13 shows the course of hardness as a function of heating temperature (annealing temperature) for three different specimens with different nitrogen contents but otherwise the same alloy composition (according to Example "A" from Table 1). In this case, the sample labeled "untreated" was not nitrided in the annealing furnace (i.e., no nitrogen donor was present during annealing in the annealing furnace, and the steel of this sample had a nitrogen content of 25±5 ppm by weight), whereas the samples labeled "71.9 ppm N2" and "107 ppm N2" were nitrided in the annealing furnace at about 550° C. to a total nitrogen content of 71.9 ppm and 107 ppm, respectively. For the "71.9 ppm N2"

sample, the nitrogen was heated to 550° C. within 1 s under 1% ammonia atmosphere in the annealing furnace (batch-type furnace process) and then the nitrogen was uniformly distributed over the cross section (under argon atmosphere for 5.5 h heating to 550° C., 5 h holding and 36 h cooling). Sample "107 ppm N2" was generated similarly to sample sample "71.9 ppm N2", but with 10 s of nitriding time. Recrystallization curves were then plotted on the nitrided samples. This shows that the nitrogen introduced during the nitriding method increased the recrystallization temperature, whereby, for example, an increase in the recrystallization temperature of approx. 20° C. was observed with a nitriding of 17 ppm nitrogen (based on the weight).

Figure 14:
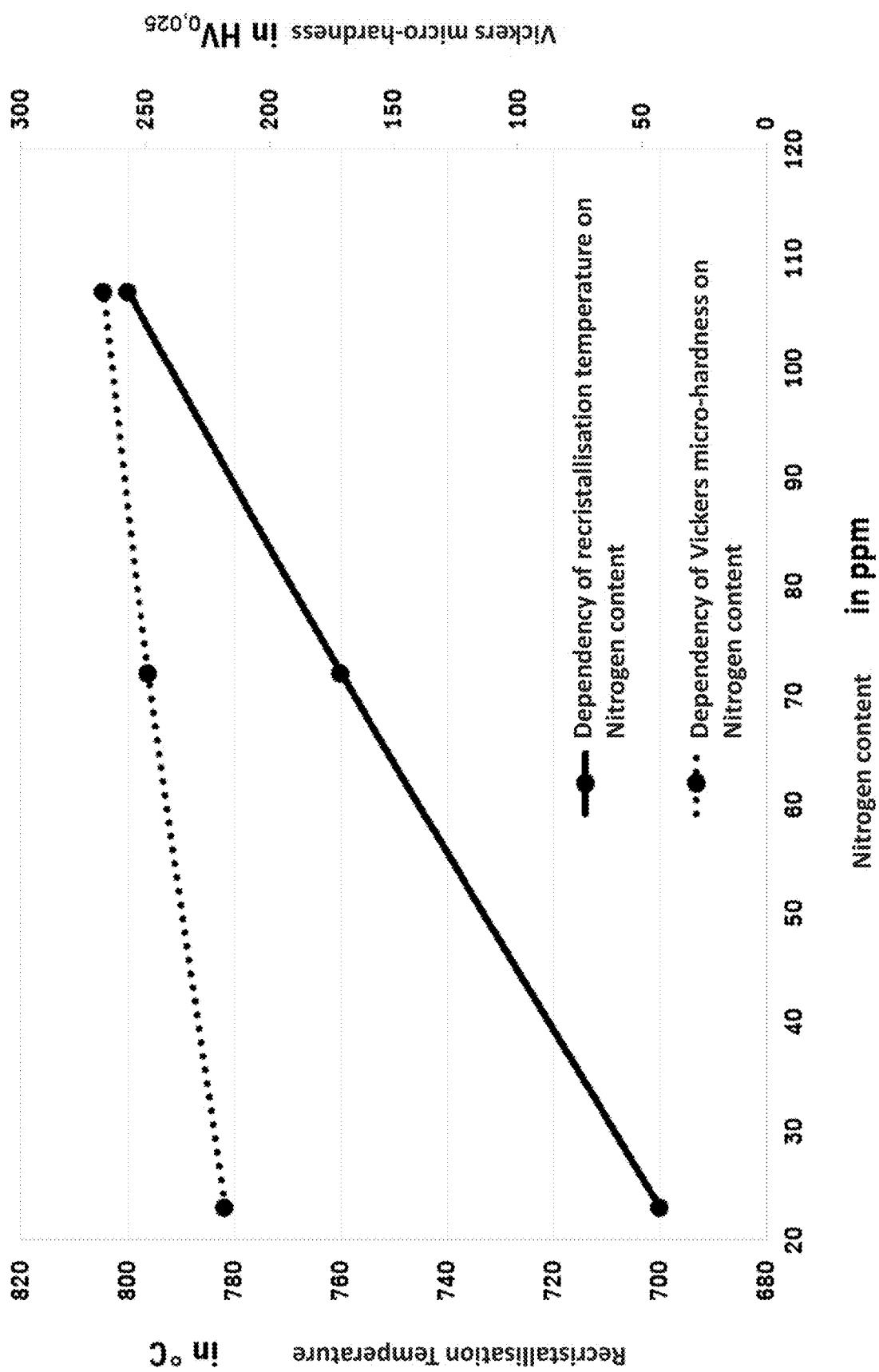
FIG. 14: Depiction of the dependence of microhardness (Vickers hardness $HV_{0.025}$) and recrystallization temperature on the nitrogen content of steel sheets nitrided to different levels.

FIG. 14 shows the dependence of the hardness (Vickers HV hardness$_{0.025}$, where the hardness was measured in the as-rolled condition of the specimens) and the recrystallization temperature on the nitrogen content of the specimens from FIG. 13, which were nitrided at different levels. A linear relationship can be seen for both the microhardness and the recrystallization temperature, i.e. the hardness and the recrystallization temperature increase linearly with increasing nitrogen content of the nitrided specimens.

Figure 16:
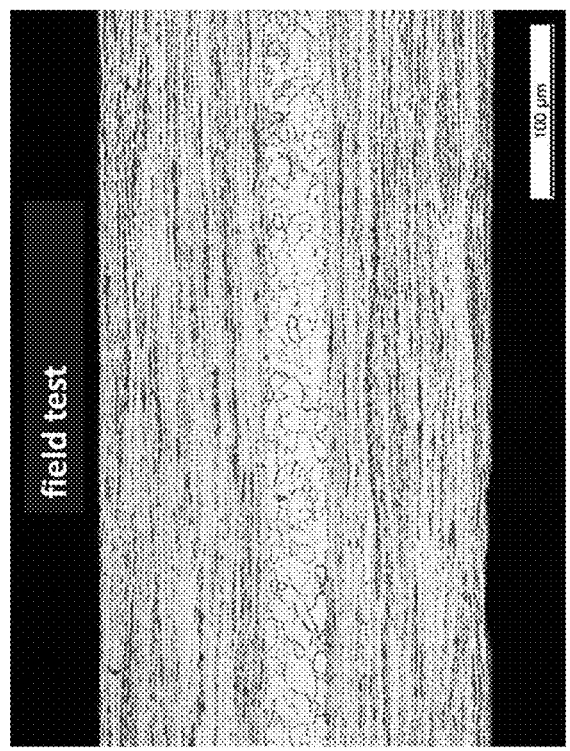
FIG. 16: Illustration of a microscopic cross-sectional image of the microstructure of an embodiment of a steel sheet according to the invention with a three-layer microstructure.
Figure 17:
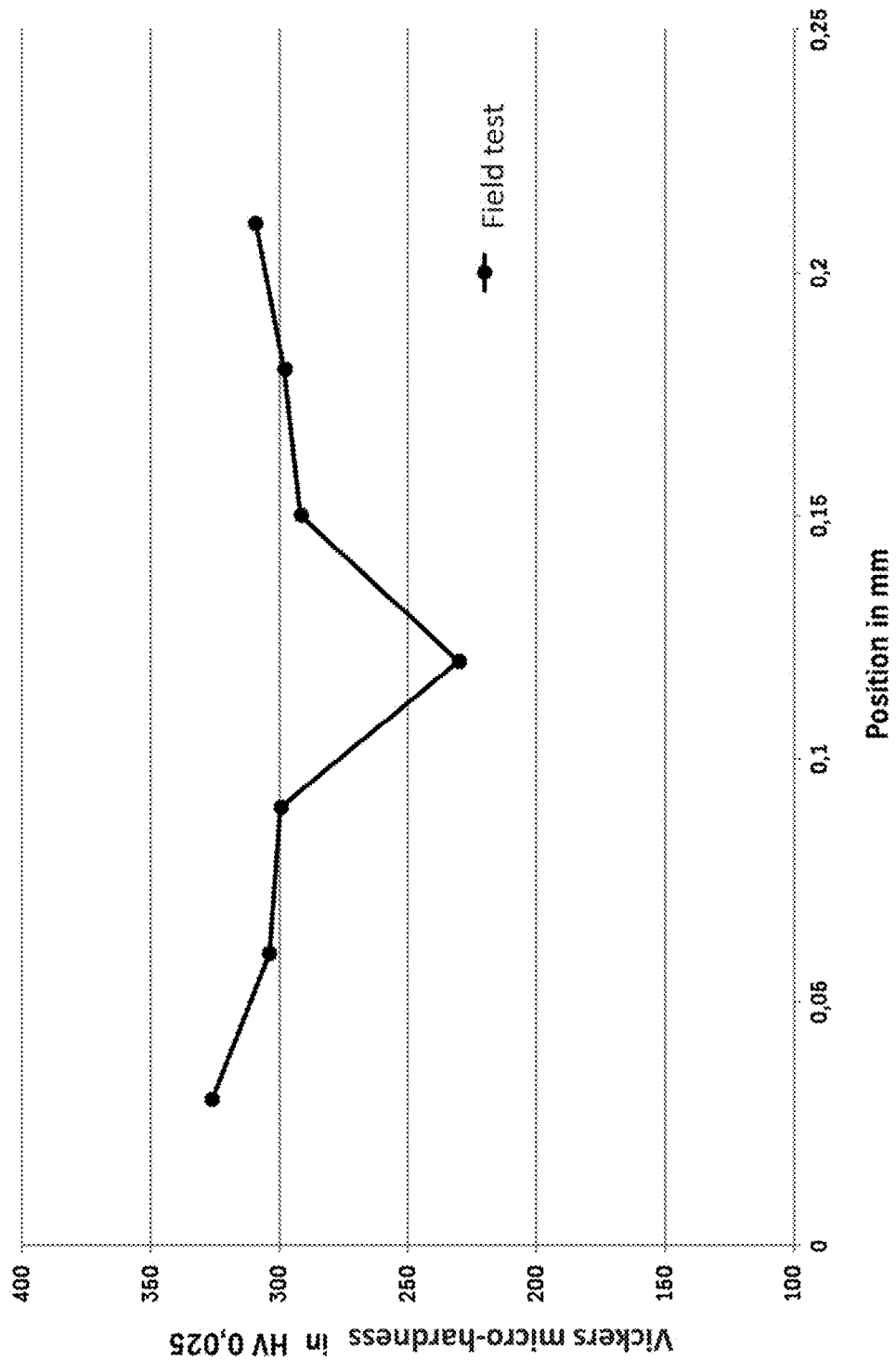
FIG. 17: Representation of the course of the microhardness of a steel sheet according to the invention over the cross-section.
Figure 18:
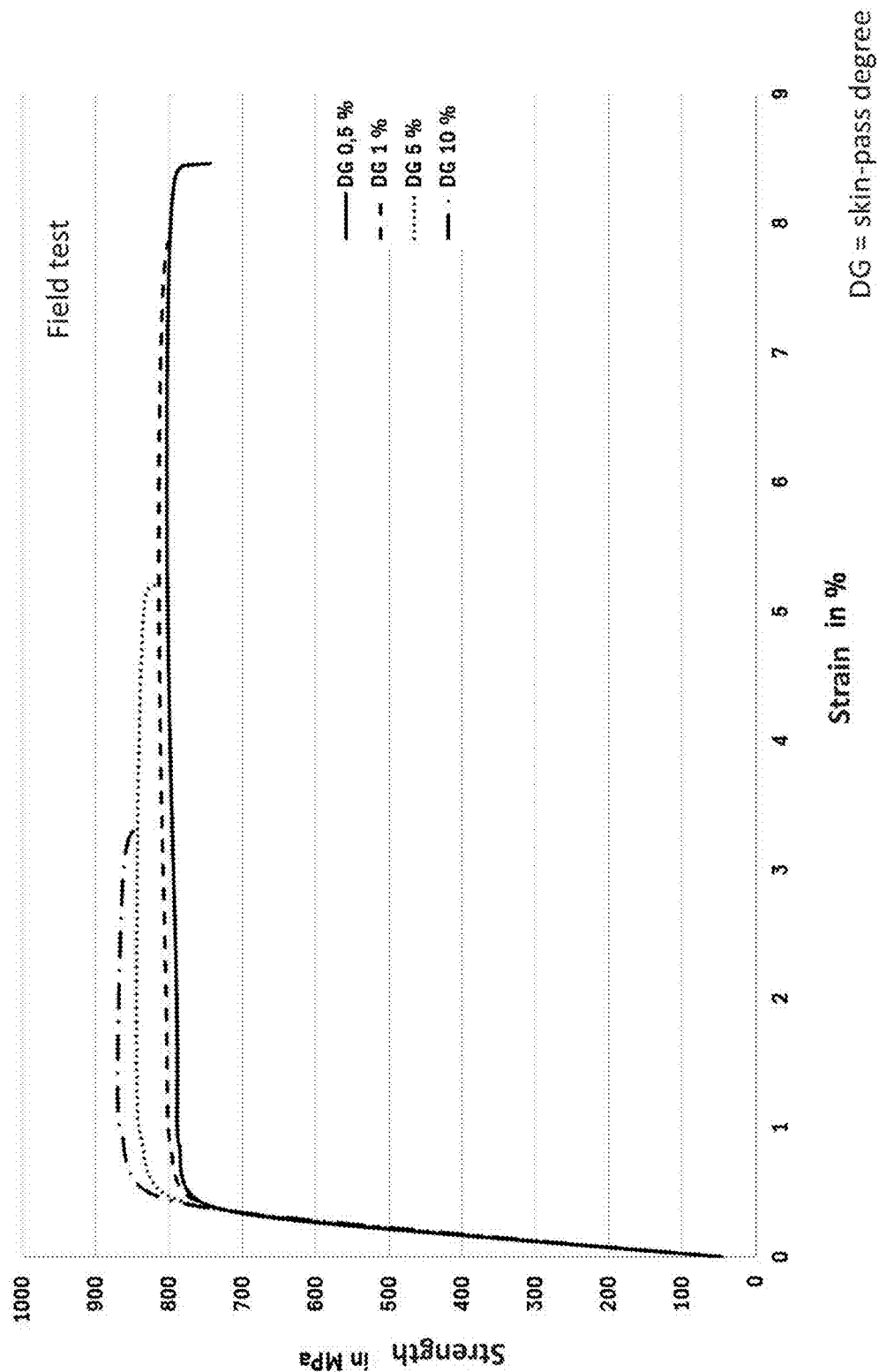
FIG. 18: Plot of the strength-elongation diagram of steel sheets according to the invention with different degrees of skin pass (DG)

Cold-rolled steel sheets with composition A according to Table 1 were thermally treated in tests with the parameters given in Table 4 shown in FIG. 23 in a continuous annealing furnace according to the invention. FIGS. 16 to 18 show the results of these tests. FIG. 16 shows a microscopic cross-sectional image of the three-layer microstructure, FIG. 17 shows the microhardness profile over the cross-section, and FIG. 18 shows strength-elongation diagrams of samples of the steel sheets which were skin-passed with different degrees of skin-passing (DG) after thermal treatment in the annealing furnace.

Figure 19:
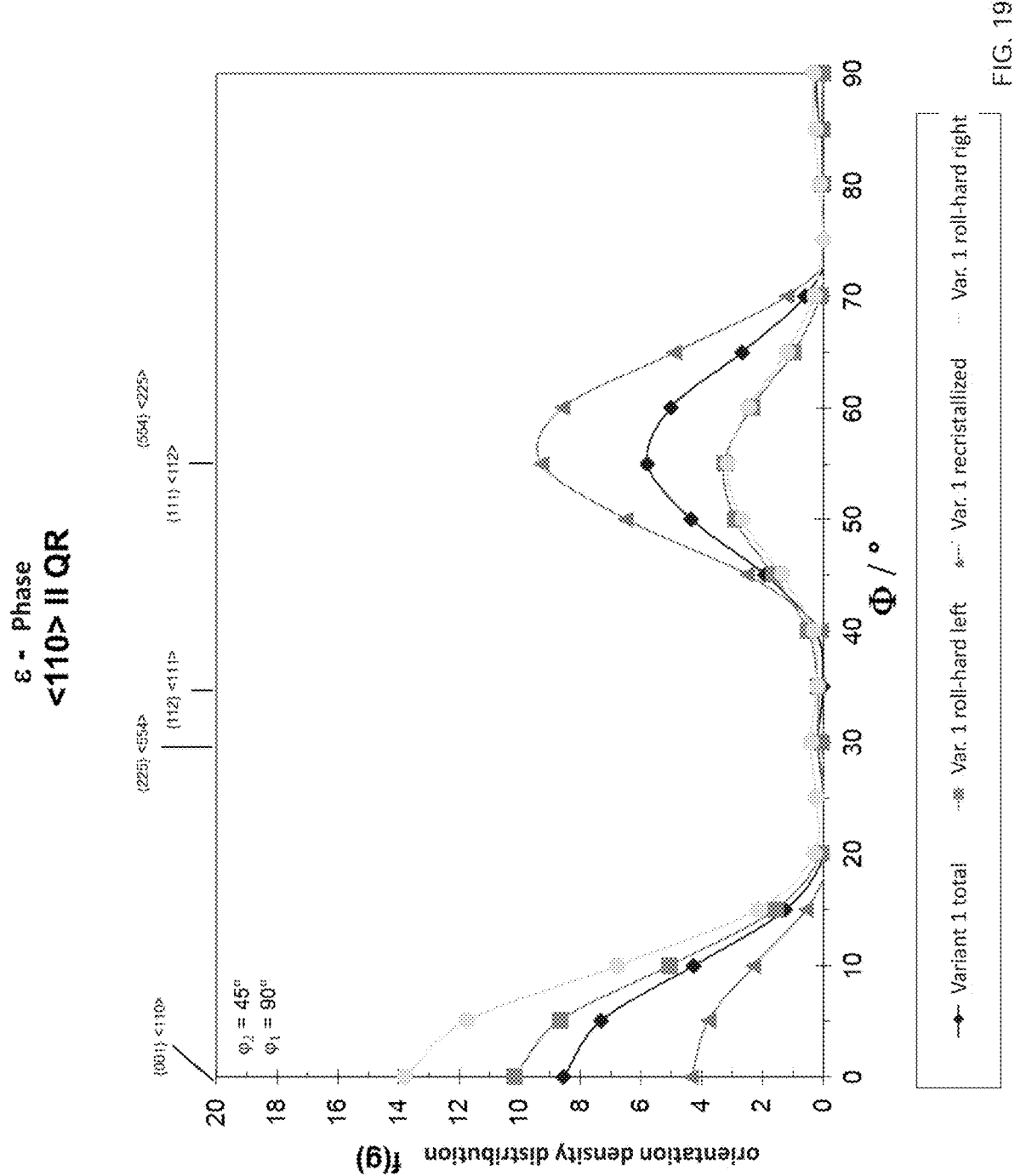
FIG. 19: Representation of the orientation density distribution function f(g) along the ε-fiber of a steel sheet according to the invention with a three-layer microstructure (sandwich structure)

Furthermore, texture measurements were carried out on the steel sheets produced according to the invention. FIG. 19 shows the orientation density distribution function f(g) along the ε-fiber of a steel sheet according to the invention with a three-layer microstructure (sandwich structure). The ε-fiber is defined by an orientation of the <110> vector parallel to the transverse direction (QR). From this diagram, a deformation index VI can be determined for the individual regions of the three-layer microstructure from the ratio of the orientation density distribution f(g) as follows:

Deformation index $VI=\{001\}$-orientation/$\{111\}$-orientation

The deformation index VI is a measure of the forming behavior of the steel sheet, because a $\{111\}$ orientation allows good formability and exhibits a good Lankford coefficient (r value), whereas the $\{001\}$ orientation is less formable. As can be seen from the diagram in FIG. 19, the individual regions (layers) of the three-layer microstructure (i.e. the recrystallized core region and the two outer, non-recrystallized fringe regions) differ from one another in terms of the orientation density gradient in the sheet plane and thus in their texture. In the example shown in FIG. 19, the deformation index in the recrystallized core region is VI=0.46 and in the two outer fringe regions the deformation index is VI=3.09 and VI=4.31, respectively.

In the steel sheets according to the invention, in each case the recrystallized first layer (which, in the case of a three-layer sandwich structure, lies on the inside and represents the core region) generally has a deformation index of less than 0.8 and the second layer (which, in the case of a three-layer sandwich structure, lies on the outside in each case and represents the fringe region) has a deformation index of more than 2.0 and, in particular, in the range from 2.0 to 5.0.

The invention claimed is:

1. A method of manufacturing a steel sheet for packaging, the method comprising:
cold rolling of a hot rolled steel sheet made of a steel having a carbon content by weight of 10 to 1000 ppm, wherein the steel of the steel sheet has a recrystallization temperature ($T_R$),
heating the cold-rolled steel sheet to a predetermined heating temperature ($T_E$) for which applies: $T_R \leq T_E$,
wherein the heating takes place at least until the recrystallization temperature ($T_R$) is reached at least temporarily in the presence of a nitrogen donor, as a result of which, when the cold-rolled steel sheet is heated, nitrogen diffuses from the nitrogen donor at least into a region of the cold-rolled steel sheet close to the surface and is incorporated in the region close to the surface, as a result of which the recrystallization temperature ($T_R$) of the steel in the region close to the surface is raised by a value $\Delta T$,
wherein the following condition applies to the heating temperature ($T_E$): $T_E < T_R + \Delta T$, and
wherein the heating of the cold-rolled steel sheet comprises at least one holding phase in which the temperature of the steel sheet is held during a holding time ($t_H$) at an intermediate temperature ($T_Z$), which is lower than the recrystallization temperature ($T_R$), and the cold-rolled steel sheet is at least temporarily exposed to the nitrogen donor before the start of and/or during the holding time ($t_H$) and, after the holding time ($t_H$) has elapsed, the cold-rolled steel sheet is heated further until the heating temperature ($T_E$) is reached, wherein the holding time ($t_H$) is between 1.0 and 300 seconds.

2. The method according to claim 1, wherein the steel of the cold-rolled steel sheet has the following composition by weight:
C: more than 0.001% and less than 0.1%;
Mn: more than 0.01% and less than 0.6%;
P: less than 0.04%;
S: less than 0.04%;
Al: less than 0.08%;
Si: less than 0.1%;
optional Cu: less than 0.1%;
optional Cr: less than 0.1%;
optional Ni: less than 0.1%;
optionally Ti: less than 0.1%;
optional Nb: less than 0.08%;
optional Mo: less than 0.08%;
optional Sn: less than 0.05%;
optional B: less than 0.01%;
optional N: less than 0.02%;
residual iron and unavoidable impurities,
wherein the average nitrogen content by weight after heating of the cold-rolled steel sheet in the presence of the nitrogen donor is at least 0.005%.

3. The method according to claim 1, wherein the steel of the cold rolled steel sheet contains at least one of titanium, niobium and aluminum with more than 200 ppm by weight titanium, more than 100 ppm by weight niobium and more than 50 ppm by weight aluminum.

4. The method according to claim 1, wherein the cold-rolled steel sheet is heated from room temperature to the heating temperature ($T_E$) within a heating time ($t_E$) of 1.0 to 300 seconds, wherein, after reaching the heating temperature ($T_E$), the steel sheet is kept at the heating temperature ($T_E$) for a predetermined annealing time ($t_G$).

5. The method according to claim 1, wherein a gradient of the nitrogen content is established in the region close to the surface during heating of the cold-rolled steel sheet, the nitrogen content decreasing from the surface to a core region of the cold-rolled steel sheet.

6. The method according to claim 5, wherein the steel of the cold-rolled steel sheet has an initial nitrogen content and the nitrogen content in the core region is greater than the initial nitrogen content of the steel.

7. The method according to claim 1, wherein the nitrogen incorporated in the region close to the surface during heating of the cold-rolled steel sheet at least partly is present in dissolved form and is interstitially incorporated in the lattice of the steel.

8. The method according to claim 1, wherein the nitrogen donor is constituted by a nitrogen-containing gas atmosphere containing ammonia, the volume concentration of the ammonia in the nitrogen-containing gas atmosphere being greater than 0.1%, and the rest of the gas atmosphere is an inert gas.

9. The method according to claim 1, wherein the value $\Delta T$ depends on the nitrogen content introduced into the region close to the surface of the steel sheet by nitriding after completion of the heating, with the following relationship: $\Delta T = a \, \Delta N$ (%), where a is a proportionality constant and $\Delta N$ (%) is the nitrogen content in % based on the weight of the steel introduced into the region (1) close to the surface during heating of the steel sheet by nitriding.

10. The method according to claim 1, wherein the value $\Delta T$ by which the recrystallization temperature in the region close to the surface is increased by the incorporation of nitrogen is greater than 30° C.

11. A method of manufacturing a steel sheet for packaging, the method comprising:

cold rolling of a hot rolled steel sheet made of a steel having a carbon content by weight of 10 to 1000 ppm, wherein the steel of the steel sheet has a recrystallization temperature ($T_R$);

heating the cold-rolled steel sheet to a predetermined heating temperature ($T_E$) for which applies: $T_R \leq T_E$;

wherein the heating takes place at least until the recrystallization temperature ($T_R$) is reached at least temporarily in the presence of a nitrogen donor, as a result of which, when the cold-rolled steel sheet is heated, nitrogen diffuses from the nitrogen donor at least into a region of the cold-rolled steel sheet close to the surface and is incorporated in the region close to the surface, as a result of which the recrystallization temperature ($T_R$) of the steel in the region close to the surface is raised by a value $\Delta T$;

wherein the following condition applies to the heating temperature ($T_E$): $T_E < T_R + \Delta T$;

wherein the cold-rolled steel sheet is heated from room temperature to the heating temperature ($T_E$) within a heating time ($t_E$) of 1.0 to 300 seconds and after reaching the heating temperature ($T_E$), the steel sheet is kept at the heating temperature ($T_E$) for a predetermined annealing time ($t_G$) of 10 seconds or lower; and wherein a gradient of the nitrogen content is established in the region close to the surface during heating of the cold-rolled steel sheet, the nitrogen content decreasing from the surface to a core region of the cold-rolled steel sheet.

* * * * *